(12) United States Patent
Hassan et al.

(10) Patent No.: US 9,870,028 B2
(45) Date of Patent: *Jan. 16, 2018

(54) UNIVERSAL DOCK FOR CONTEXT SENSITIVE COMPUTING DEVICE

(71) Applicant: Microsoft Technology Licensing, LLC, Redmond, WA (US)

(72) Inventors: Amer A. Hassan, Kirkland, WA (US); Yatharth Gupta, Kirkland, WA (US); Ravi T. Rao, Redmond, WA (US); Billy R. Anders, Jr., Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,728

(22) Filed: Jan. 5, 2017

(65) Prior Publication Data

US 2017/0115696 A1    Apr. 27, 2017

Related U.S. Application Data

(63) Continuation of application No. 12/960,753, filed on Dec. 6, 2010, now Pat. No. 9,542,203.

(51) Int. Cl.
*G06F 13/00* (2006.01)
*G06F 17/00* (2006.01)
(Continued)

(52) U.S. Cl.
CPC .......... *G06F 1/1632* (2013.01); *G06F 1/1626* (2013.01); *G06F 13/4081* (2013.01)

(58) Field of Classification Search
CPC ............. G06F 13/00; G06F 1/30; G06F 17/00
See application file for complete search history.

(56) References Cited

U.S. PATENT DOCUMENTS 4,949,299 A    8/1990    Pickett
5,574,964 A   11/1996    Hamlin
(Continued)

FOREIGN PATENT DOCUMENTS

CN    1571341 A    1/2005
CN    1592210 A    3/2005
(Continued)

OTHER PUBLICATIONS

Final Office Action dated Nov. 13, 2012 in U.S. Appl. No. 12/748,829, 42 pages.
(Continued)

*Primary Examiner* — Henry Tsai
*Assistant Examiner* — Christopher A Daley
(74) *Attorney, Agent, or Firm* — Davin Chin; Chin IP, PLLC

(57) ABSTRACT

A dock for interacting with a computing device. The computing device configures itself for operations based on its context, which may be determined form the dock by reading a value from a tag on the dock. The computing device may use low power transmissions such that receiving a value from the tag provides an indication of proximity to the dock. The value read provides an indication of a desired operation, and, in response to reading a value of the tag, the computing device may launch an application, pair with devices in the vicinity of the dock, or take other actions that configure the computing device. A universal dock, usable with computing devices of a plurality of form factors, may be implemented by providing an array of tags and, in some cases, a non-contact power supply.

20 Claims, 8 Drawing Sheets

(51) Int. Cl.
*G06F 1/16* (2006.01)
*G06F 13/40* (2006.01)
*G06F 1/30* (2006.01)

(56) References Cited

U.S. PATENT DOCUMENTS

| | | | |
|---|---|---|---|
| 5,682,382 A | 10/1997 | Shepard | |
| 5,689,825 A | 11/1997 | Averbuch et al. | |
| 5,729,682 A | 3/1998 | Marquis et al. | |
| 5,963,915 A | 10/1999 | Kirsch | |
| 5,966,441 A | 10/1999 | Calamera | |
| 6,288,749 B1 | 9/2001 | Freadman | |
| 6,317,490 B1 | 11/2001 | Cameron et al. | |
| 6,338,046 B1 | 1/2002 | Saari et al. | |
| 6,343,205 B1 | 1/2002 | Threadgill et al. | |
| 6,553,060 B2 | 4/2003 | Souissi et al. | |
| 6,628,965 B1 | 9/2003 | Larosa et al. | |
| 6,665,709 B1 | 12/2003 | Barron | |
| 6,711,617 B1 | 3/2004 | Bantz et al. | |
| 6,789,228 B1 | 9/2004 | Merril et al. | |
| 6,823,379 B1 | 11/2004 | Heckel et al. | |
| 7,020,472 B2 | 3/2006 | Schmidt | |
| 7,027,808 B2 | 4/2006 | Wesby | |
| 7,058,696 B1 | 6/2006 | Phillips et al. | |
| 7,107,009 B2 | 9/2006 | Sairanen et al. | |
| 7,110,843 B2 | 9/2006 | Pagnano et al. | |
| 7,177,288 B2 | 2/2007 | Mooney et al. | |
| 7,194,278 B1 | 3/2007 | Cook | |
| 7,274,911 B2 | 9/2007 | Li | |
| 7,280,978 B1 | 10/2007 | Joao | |
| 7,290,132 B2 | 10/2007 | Aboba et al. | |
| 7,349,342 B2 | 3/2008 | Carpenter et al. | |
| 7,400,253 B2 | 7/2008 | Cohen | |
| 7,412,534 B2 | 8/2008 | Tsang et al. | |
| 7,454,191 B2 | 11/2008 | Dawson et al. | |
| 7,460,253 B2 | 12/2008 | Osada | |
| 7,461,253 B2 | 12/2008 | Braskich et al. | |
| 7,496,637 B2 | 2/2009 | Han et al. | |
| 7,512,401 B2 | 3/2009 | Muhonen et al. | |
| 7,558,604 B2 | 7/2009 | Narayanaswami et al. | |
| 7,562,129 B1 | 7/2009 | Lee et al. | |
| 7,577,125 B2 | 8/2009 | Abhishek et al. | |
| 7,580,678 B2 | 8/2009 | Byman-Kivivuori et al. | |
| 7,584,296 B2 | 9/2009 | Sun et al. | |
| 7,589,693 B2 | 9/2009 | Locke | |
| 7,640,213 B2 | 12/2009 | Reunert et al. | |
| 7,721,093 B2 | 5/2010 | Sundararajan | |
| 7,729,689 B2 | 6/2010 | Chakraborty et al. | |
| 7,751,317 B2 | 7/2010 | Toyama et al. | |
| 7,769,394 B1 | 8/2010 | Zhu | |
| 7,783,019 B2 | 8/2010 | Mahone et al. | |
| 7,792,920 B2 | 9/2010 | Istvan et al. | |
| 7,925,739 B2 | 4/2011 | Kocho et al. | |
| 7,962,854 B2 | 6/2011 | Vance et al. | |
| 7,991,770 B2 | 8/2011 | Covell et al. | |
| 8,014,415 B2 | 9/2011 | Alapuranen | |
| 8,095,111 B2 | 1/2012 | Henry, Jr. et al. | |
| 8,098,803 B1 | 1/2012 | Croak et al. | |
| 8,204,013 B2 | 6/2012 | Lewis | |
| 8,239,516 B2 | 8/2012 | Huslak et al. | |
| 8,254,878 B2 | 8/2012 | Howard et al. | |
| 8,254,992 B1 | 8/2012 | Ashenbrenner et al. | |
| 8,260,998 B2 | 9/2012 | Ganesh et al. | |
| 8,285,250 B2 | 10/2012 | Rubin et al. | |
| 8,323,040 B2 | 12/2012 | Prest | |
| 8,326,958 B1 | 12/2012 | Raleigh | |
| 8,375,328 B2 | 2/2013 | Koh et al. | |
| 8,397,982 B2 | 3/2013 | Slaby et al. | |
| 8,437,736 B2 | 5/2013 | Rubin et al. | |
| 8,479,225 B2 | 7/2013 | Covell et al. | |
| 8,493,931 B1 | 7/2013 | Nix | |
| 8,565,928 B2 | 10/2013 | Venkatakrishnan et al. | |
| 8,577,329 B2 | 11/2013 | Momtahan et al. | |
| 8,589,991 B2 | 11/2013 | Hassan et al. | |
| 8,606,911 B2 | 12/2013 | Raleigh et al. | |
| 8,621,097 B2 | 12/2013 | Venkatakrishnan et al. | |
| 8,633,616 B2 | 1/2014 | Soar | |
| 8,659,565 B2 | 2/2014 | Sirpal et al. | |
| 8,700,641 B2 | 4/2014 | Covell et al. | |
| 8,792,429 B2 | 7/2014 | Hassan et al. | |
| 8,813,201 B2 | 8/2014 | Lambert et al. | |
| 8,892,691 B2 | 11/2014 | Pantos et al. | |
| 8,971,841 B2 | 3/2015 | Menezes et al. | |
| 8,977,731 B2 | 3/2015 | Venkatakrishnan et al. | |
| 8,984,628 B2 | 3/2015 | Mahaffey et al. | |
| 9,008,610 B2 | 4/2015 | Menezes et al. | |
| 9,009,828 B1 | 4/2015 | Ramsey et al. | |
| 9,148,238 B2 | 9/2015 | Dureau | |
| 9,178,652 B2 | 11/2015 | Hassan et al. | |
| 9,237,366 B2 | 1/2016 | Schaffer et al. | |
| 9,392,462 B2 | 7/2016 | Raleigh et al. | |
| 9,450,995 B2 | 9/2016 | Hassan et al. | |
| 9,596,220 B2 | 3/2017 | Hassan et al. | |
| 2001/0021950 A1 | 9/2001 | Hawley et al. | |
| 2001/0037399 A1 | 11/2001 | Eylon et al. | |
| 2001/0042124 A1 | 11/2001 | Barron | |
| 2001/0046298 A1 | 11/2001 | Terada et al. | |
| 2001/0052052 A1 | 12/2001 | Peng | |
| 2002/0067268 A1 | 6/2002 | Lee et al. | |
| 2002/0116485 A1 | 8/2002 | Black et al. | |
| 2002/0120935 A1 | 8/2002 | Huber et al. | |
| 2002/0143819 A1 | 10/2002 | Han et al. | |
| 2002/0154751 A1 | 10/2002 | Thompson et al. | |
| 2002/0156876 A1 | 10/2002 | Hartman et al. | |
| 2002/0183038 A1 | 12/2002 | Comstock et al. | |
| 2003/0142651 A1 | 7/2003 | Matta et al. | |
| 2003/0187992 A1 | 10/2003 | Steenfeldt et al. | |
| 2003/0231586 A1 | 12/2003 | Chheda | |
| 2004/0002305 A1 | 1/2004 | Byman-Kivivuori et al. | |
| 2004/0002326 A1 | 1/2004 | Maher | |
| 2004/0006606 A1 | 1/2004 | Marotta et al. | |
| 2004/0049576 A1 | 3/2004 | Schweitzer et al. | |
| 2004/0061716 A1 | 4/2004 | Cheung et al. | |
| 2004/0128363 A1 | 7/2004 | Yamagami et al. | |
| 2004/0174395 A1 | 9/2004 | Liu | |
| 2004/0198374 A1 | 10/2004 | Bajikar | |
| 2004/0203815 A1 | 10/2004 | Shoemake et al. | |
| 2004/0205154 A1 | 10/2004 | Dalton et al. | |
| 2004/0210320 A1 | 10/2004 | Pandya | |
| 2004/0260630 A1 | 12/2004 | Benco et al. | |
| 2005/0028208 A1 | 2/2005 | Ellis et al. | |
| 2005/0071319 A1 | 3/2005 | Kelley et al. | |
| 2005/0083975 A1 | 4/2005 | Macri | |
| 2005/0085222 A1 | 4/2005 | Przybilski et al. | |
| 2005/0097248 A1 | 5/2005 | Kelley | |
| 2005/0105632 A1 | 5/2005 | Catreux-Erces et al. | |
| 2005/0135235 A1 | 6/2005 | Maruyama et al. | |
| 2005/0136886 A1 | 6/2005 | Aamio et al. | |
| 2005/0136920 A1 | 6/2005 | Rink et al. | |
| 2005/0159179 A1 | 7/2005 | Sainton et al. | |
| 2005/0177715 A1 | 8/2005 | Somin et al. | |
| 2005/0198238 A1 | 9/2005 | Sim et al. | |
| 2005/0221844 A1 | 10/2005 | Trethewey et al. | |
| 2005/0223226 A1 | 10/2005 | Sundararajan | |
| 2005/0229246 A1 | 10/2005 | Rajagopal et al. | |
| 2005/0249266 A1 | 11/2005 | Brown et al. | |
| 2006/0015904 A1 | 1/2006 | Marcus | |
| 2006/0041916 A1 | 2/2006 | Mcquaide | |
| 2006/0059462 A1 | 3/2006 | Yamamoto | |
| 2006/0107036 A1 | 5/2006 | Randle et al. | |
| 2006/0143027 A1 | 6/2006 | Jagannathan et al. | |
| 2006/0145815 A1 | 7/2006 | Lanzieri et al. | |
| 2006/0171304 A1 | 8/2006 | Hill et al. | |
| 2006/0200678 A1 | 9/2006 | Yamada et al. | |
| 2006/0239208 A1 | 10/2006 | Roberts et al. | |
| 2006/0290519 A1 | 12/2006 | Boate et al. | |
| 2006/0294112 A1 | 12/2006 | Mandato et al. | |
| 2007/0054616 A1 | 3/2007 | Culbert | |
| 2007/0057793 A1* | 3/2007 | Alden | G06F 3/0202 340/572.1 |
| 2007/0064604 A1 | 3/2007 | Chen et al. | |
| 2007/0124485 A1 | 5/2007 | Frost et al. | |
| 2007/0124756 A1 | 5/2007 | Covell et al. | |
| 2007/0153695 A1 | 7/2007 | Gholmieh et al. | |

(56) References Cited

U.S. PATENT DOCUMENTS

| | | | |
|---|---|---|---|
| 2007/0153729 A1 | 7/2007 | Alapuranen |
| 2007/0161411 A1 | 7/2007 | Liao et al. |
| 2007/0171915 A1 | 7/2007 | Toyama et al. |
| 2007/0192735 A1 | 8/2007 | Lehto et al. |
| 2007/0207750 A1 | 9/2007 | Brown et al. |
| 2007/0223398 A1 | 9/2007 | Luo et al. |
| 2007/0225831 A1 | 9/2007 | Sakurada |
| 2007/0248179 A1 | 10/2007 | Hassan et al. |
| 2007/0254628 A1 | 11/2007 | Rybak |
| 2007/0271525 A1 | 11/2007 | Han et al. |
| 2007/0274488 A1 | 11/2007 | Callaghan |
| 2007/0280332 A1 | 12/2007 | Srikanteswara et al. |
| 2007/0280481 A1 | 12/2007 | Eastlake et al. |
| 2008/0002658 A1 | 1/2008 | Soliman |
| 2008/0016338 A1 | 1/2008 | Sun |
| 2008/0031155 A1 | 2/2008 | Korus et al. |
| 2008/0055399 A1 | 3/2008 | Woodworth et al. |
| 2008/0055423 A1 | 3/2008 | Ying et al. |
| 2008/0063204 A1 | 3/2008 | Braskich et al. |
| 2008/0065238 A1 | 3/2008 | Igoe |
| 2008/0081597 A1 | 4/2008 | Cole |
| 2008/0104170 A1 | 5/2008 | Ananthanarayanan |
| 2008/0130519 A1 | 6/2008 | Bahl et al. |
| 2008/0130639 A1 | 6/2008 | Costa-Requena et al. |
| 2008/0132201 A1 | 6/2008 | Karlberg |
| 2008/0152098 A1 | 6/2008 | Paryzek et al. |
| 2008/0195861 A1 | 8/2008 | Salomone |
| 2008/0197802 A1 | 8/2008 | Onishi et al. |
| 2008/0207119 A1 | 8/2008 | Chang |
| 2008/0207128 A1 | 8/2008 | Mikko |
| 2008/0227384 A1 | 9/2008 | Placzek et al. |
| 2008/0252419 A1* | 10/2008 | Batchelor ............. G06F 1/1632 340/10.1 |
| 2008/0275993 A1 | 11/2008 | Mohammed et al. |
| 2008/0293375 A1 | 11/2008 | Swanburg |
| 2008/0293419 A1 | 11/2008 | Somasundaram et al. |
| 2008/0311952 A1 | 12/2008 | Sugiyama |
| 2008/0319857 A1 | 12/2008 | Dobbins et al. |
| 2009/0011738 A1 | 1/2009 | Sasakura |
| 2009/0013175 A1 | 1/2009 | Elliott |
| 2009/0039828 A1 | 2/2009 | Jakubowski |
| 2009/0045913 A1 | 2/2009 | Nelson et al. |
| 2009/0055266 A1 | 2/2009 | Brody et al. |
| 2009/0089885 A1 | 4/2009 | Noble et al. |
| 2009/0100080 A1 | 4/2009 | Toms et al. |
| 2009/0103481 A1 | 4/2009 | Mahajan et al. |
| 2009/0106542 A1 | 4/2009 | Dubs et al. |
| 2009/0111378 A1 | 4/2009 | Sheynman et al. |
| 2009/0138715 A1 | 5/2009 | Kiao et al. |
| 2009/0144622 A1 | 6/2009 | Evans et al. |
| 2009/0154343 A1 | 6/2009 | Fitch et al. |
| 2009/0158394 A1 | 6/2009 | Oh et al. |
| 2009/0170431 A1 | 7/2009 | Pering et al. |
| 2009/0196180 A1 | 8/2009 | Bahl et al. |
| 2009/0210940 A1 | 8/2009 | Dean |
| 2009/0249322 A1 | 10/2009 | Sugiyama et al. |
| 2009/0303902 A1 | 12/2009 | Liu et al. |
| 2009/0319663 A1 | 12/2009 | Giles et al. |
| 2010/0049971 A1 | 2/2010 | Oh |
| 2010/0056124 A1 | 3/2010 | Keating et al. |
| 2010/0081473 A1 | 4/2010 | Chatterjee et al. |
| 2010/0091965 A1 | 4/2010 | Ma et al. |
| 2010/0097830 A1 | 4/2010 | Wang |
| 2010/0100637 A1 | 4/2010 | Bowra et al. |
| 2010/0103850 A1 | 4/2010 | Gossain et al. |
| 2010/0104078 A1 | 4/2010 | Henry, Jr. et al. |
| 2010/0110890 A1 | 5/2010 | Rainer et al. |
| 2010/0111033 A1 | 5/2010 | Erceg et al. |
| 2010/0115278 A1 | 5/2010 | Shen et al. |
| 2010/0121744 A1 | 5/2010 | Belz et al. |
| 2010/0123598 A1 | 5/2010 | Brodersen et al. |
| 2010/0123834 A1 | 5/2010 | Brodersen et al. |
| 2010/0144274 A1 | 6/2010 | Mcdowall et al. |
| 2010/0153762 A1 | 6/2010 | Radulescu et al. |
| 2010/0157167 A1 | 6/2010 | Lawther et al. |
| 2010/0175101 A1 | 7/2010 | Devictor et al. |
| 2010/0186066 A1 | 7/2010 | Pollard |
| 2010/0191576 A1 | 7/2010 | Raleigh |
| 2010/0191847 A1 | 7/2010 | Raleigh |
| 2010/0195580 A1 | 8/2010 | Samarasooriya et al. |
| 2010/0198952 A1 | 8/2010 | Kneckt et al. |
| 2010/0220856 A1 | 9/2010 | Kruys et al. |
| 2010/0226253 A1 | 9/2010 | Bugenhagen |
| 2010/0232332 A1 | 9/2010 | Abdel-Kader |
| 2010/0248599 A1 | 9/2010 | Voigt et al. |
| 2010/0257251 A1 | 10/2010 | Mooring et al. |
| 2010/0284316 A1 | 11/2010 | Sampathkumar |
| 2010/0302005 A1 | 12/2010 | Popovski |
| 2010/0333032 A1 | 12/2010 | Lau et al. |
| 2011/0010433 A1 | 1/2011 | Wilburn et al. |
| 2011/0107388 A1 | 5/2011 | Lee et al. |
| 2011/0145581 A1 | 6/2011 | Malhotra et al. |
| 2011/0149806 A1 | 6/2011 | Verma et al. |
| 2011/0176463 A1 | 7/2011 | Cowan et al. |
| 2011/0188391 A1 | 8/2011 | Sella et al. |
| 2011/0188419 A1 | 8/2011 | Filoso et al. |
| 2011/0188420 A1 | 8/2011 | Filoso et al. |
| 2011/0202189 A1 | 8/2011 | Venkatakrishnan et al. |
| 2011/0230209 A1 | 9/2011 | Kilian |
| 2011/0238498 A1 | 9/2011 | Hassan et al. |
| 2011/0261001 A1 | 10/2011 | Liu |
| 2011/0274020 A1 | 11/2011 | Filoso et al. |
| 2011/0275316 A1 | 11/2011 | Suumaeki et al. |
| 2011/0280413 A1 | 11/2011 | Wu et al. |
| 2011/0293095 A1 | 12/2011 | Ben Ayed |
| 2011/0320963 A1 | 12/2011 | Wong |
| 2011/0321126 A1 | 12/2011 | Maniatopoulos |
| 2012/0101952 A1 | 4/2012 | Raleigh et al. |
| 2012/0139690 A1 | 6/2012 | Gupta et al. |
| 2012/0144083 A1 | 6/2012 | Hassan et al. |
| 2012/0147268 A1 | 6/2012 | Hassan et al. |
| 2012/0147274 A1 | 6/2012 | Hassan et al. |
| 2012/0147825 A1 | 6/2012 | Hassan et al. |
| 2012/0155643 A1 | 6/2012 | Hassan et al. |
| 2012/0157038 A1 | 6/2012 | Menezes et al. |
| 2012/0158839 A1 | 6/2012 | Hassan et al. |
| 2012/0158947 A1 | 6/2012 | Hassan et al. |
| 2012/0158981 A1 | 6/2012 | Desai et al. |
| 2012/0178429 A1 | 7/2012 | Camps Mur et al. |
| 2012/0197792 A1 | 8/2012 | Raleigh |
| 2013/0033800 A1 | 2/2013 | Bartnik et al. |
| 2013/0097422 A1 | 4/2013 | Salomone |
| 2013/0182614 A1 | 7/2013 | Kumar et al. |
| 2013/0211893 A1 | 8/2013 | Bryant et al. |
| 2013/0322846 A1 | 12/2013 | Ferren et al. |
| 2014/0328251 A1 | 11/2014 | Hassan et al. |

FOREIGN PATENT DOCUMENTS

| | | |
|---|---|---|
| CN | 1607780 A | 4/2005 |
| CN | 1677975 A | 10/2005 |
| CN | 1929424 A | 3/2007 |
| CN | 1960474 A | 5/2007 |
| CN | 101021774 A | 8/2007 |
| CN | 101044718 A | 9/2007 |
| CN | 101075820 A | 11/2007 |
| CN | 101094140 A | 12/2007 |
| CN | 101137960 A | 3/2008 |
| CN | 101147308 A | 3/2008 |
| CN | 101179359 A | 5/2008 |
| CN | 101288063 A | 10/2008 |
| CN | 101657828 A | 2/2010 |
| CN | 1662920 B | 4/2010 |
| CN | 101841637 A | 9/2010 |
| CN | 101867623 A | 10/2010 |
| EP | 2256663 A | 12/2010 |
| GB | 2418809 A | 4/2006 |
| JP | 2001160927 A | 6/2001 |
| JP | 2005004089 A | 1/2005 |
| JP | 2005295286 A | 10/2005 |
| JP | 2005341094 A | 12/2005 |
| JP | 2006050216 A | 2/2006 |
| JP | 2007527156 A | 9/2007 |
| KR | 2008032979 A | 4/2008 |

(56) References Cited

FOREIGN PATENT DOCUMENTS

| KR | 20100038089 A | 4/2010 |
|---|---|---|
| WO | 0147248 A | 6/2001 |
| WO | 0154342 A | 7/2001 |
| WO | 2004003801 A1 | 1/2004 |
| WO | 2006131077 A1 | 12/2006 |
| WO | 2008021855 A | 2/2008 |
| WO | 2008089854 A | 7/2008 |
| WO | 2008127507 A | 10/2008 |
| WO | 2009046869 A | 4/2009 |
| WO | 2010044599 A | 4/2010 |
| WO | 2010132296 A1 | 11/2010 |

OTHER PUBLICATIONS

Final Office Action dated Nov. 15, 2010 in U.S. Appl. No. 11/726,862, 21 pages.
Final Office Action dated Dec. 26, 2013 in U.S. Appl. No. 12/967,638, 34 pages.
Final Office Action dated Dec. 4, 2014 in U.S. Appl. No. 12/960,730, 22 pages.
Final Office Action dated Dec. 5, 2014 in U.S. Appl. No. 12/970,069, 21 pages.
Final Office Action dated Feb. 11, 2014 in U.S. Appl. No. 12/970,069, 26 pages.
Final Office Action dated Feb. 15, 2013 in U.S. Appl. No. 12/967,761, 28 pages.
Final Office Action dated Feb. 15, 2013 in U.S. Appl. No. 12/970,069, 23 pages.
Final Office Action dated Mar. 11, 2016 in U.S. Appl. No. 12/960,753, 17 pages.
Final Office Action dated Mar. 28, 2013 in U.S. Appl. No. 12/967,638, 22 pages.
Final Office Action dated Jun. 9, 2016 in U.S. Appl. No. 14/600,477, 9 pages.
Final Office Action dated Jul. 12, 2016 in U.S. Appl. No. 14/981,271, 10 pages.
Final Office Action dated Jul. 13, 2015 in U.S. Appl. No. 14/318,380, 8 pages.
Final Office Action dated Sep. 15, 2011 in U.S. Appl. No. 11/726,862, 24 pages.
Final Office Action dated Sep. 20, 2012 in U.S. Appl. No. 11/726,862, 35 pages.
Final Office Action dated Sep. 23, 2013 in U.S. Appl. No. 12/970,034, 22 pages.
Guide to IEEE 802.11i: Establishing Robust Security Networks;Published Date: Jun. 2006; 155 pages.
Haas, Robert et al., "Cost-and Quality-of-Service-Aware Network-Service Deployment," 2001, 6 pages.
Hassan, Amer, "Cognitive Use of Multiple Regulatory Domains"; U.S. Appl. No. 14/458,203, filed Aug. 12, 2014; 58 pages including Preliminary Amendment filed Oct. 9, 2014.
Hassan, Amer, "Cognitive Use of Multiple Regulatory Domains"; U.S. Appl. No. 14/863,290, filed Sep. 23, 2015; 57 pages including Preliminary Amendment filed Nov. 1, 2015.
Hassan, Amer, "Cognitive Use of Multiple Regulatory Domains"; U.S. Appl. No. 15/233,348, filed Aug. 10, 2016; 57 pages including Preliminary Amendment filed Sep. 21, 2016.
Hassan, Amer, "Direct Connection With Side Channel Control"; U.S. Appl. No. 14/333,386, filed Jul. 16, 2014; 65 pages including Preliminary Amendment filed Sep. 26, 2014.
Hassan, Amer, "Direct Connection With Side Channel Control"; U.S. Appl. No. 14/993,786, filed Jan. 12, 2016; 64 pages including Preliminary Amendment filed Jan. 13, 2016.
Hassan, Amer, "Secure Protocol for Peer-To-Peer Network"; U.S. Appl. No. 14/600,477, filed Jan. 20, 2015; 62 pages including Preliminary Amendment filed May 8, 2014.
How Do You Use a Laptop as a TV Remote Control?; Published Date: Jul. 15, 2008; 6 pages.
International Search Report dated Jul. 24, 2012 in PCT Application No. PCT/US2011/065691, Filing Date: Dec. 17, 2011, 11 pages.
International Search Report dated Sep. 5, 2012 in PCT Application No. PCT/US2011/065692, Filing Date: Dec. 17, 2011, 8 pages.
International Search Report; dated Aug. 31, 2012; Application No. PCT/US2011/064753; Filed Date: Dec. 14, 2011, pp. 8.
International Search Report; dated Jul. 31, 2012; Application No. PCT/US2011/065285; Filed Date: Dec. 15, 2011, pp. 9.
Kaasinen, et al., "Ambient Functionality—Use Cases", In Proceedings of the 2005 joint conference on Smart objects and ambient intelligence: innovative context-aware services: usages and technologies, Oct. 12, 2005, 6 pages.
Kitson, Fred., "Mobile Media Making it a Reality", In Proceedings of Mobile Computing, vol. 3, Issue 4, Jun. 7, 2005, 17 pages.
Klym, et al., "The Evolution of RFID Networks: The Potential for Disruptive Innovation", In White Paper, Mar. 2006, 20 pages.
Lun, Desmond S. et al., "Network Coding with a Cost Criterion," MIT LIDS Technical Report P-2584, Apr. 2004, 18 pages.
Manage Subscription Products & Automate Recurring Billing Operations; Copyright 2008-2009; Retrieved Date: Jan. 12, 2010, 1 page.
Manifest Permission; Published Date: Jul. 21, 2004; 19 pages.
Meinrath et al.; "Unlicensed 'White Space Device' Operations on the TV Band and the Myth of Harmful Interferences", Mar. 2008, 13 pages.
Meinrath et al.; ""White Space Devices" & the Myths of Harmful Interference", 11 N.Y.U.J. Legis&Pub. Policy 495, 2008, 24 pages.
Menezes, Pascal; "Operating System Supporting Cost Aware Applications"; U.S. Appl. No. 13/844,932, filed Mar. 16, 2013; 57 pages.
Menezes, Pascal; "Operating System Supporting Cost Aware Applications"; U.S. Appl. No. 14/318,380, filed Mar. 16, 2013; 56 pages.
Menezes, Pascal; "Operating System Supporting Cost Aware Applications"; U.S. Appl. No. 14/981,271, filed Dec. 28, 2016; 63 pages including Preliminary Amendment filed Jan. 20, 2016.
Menezes, Pascal; "Operating System Supporting Cost Aware Applications"; U.S. Appl. No. 15/098,321, filed Apr. 14, 2016; 57 pages.
MIST: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, filed Feb. 20. 2013, 49 pages.
Motorola, "TV White Space Position Paper," 2008, 10 pages.
Non-Final Office Action dated Jan. 21, 2016 in U.S. Appl. No. 14/863,290, 7 pages.
Non-Final Office Action dated Jan. 4, 2013 in U.S. Appl. No. 12/960,730, 14 pages.
Non-Final Office Action dated Oct. 2, 2012 in U.S. Appl. No. 12/967,638, 33 pages.
Non-Final Office Action dated Oct. 16, 2012 in U.S. Appl. No. 12/970,069, 23 pages.
Non-Final Office Action dated Oct. 2, 2014 in U.S. Appl. No. 14/318,380, 5 pages.
"International Preliminary Report on Patentability Issued in PCT Application No. PCT/US11/65691", dated Jun. 18, 2013, 5 Pages.
"International Search Report", dated Aug. 14, 2012, Application No. PCT/US2011/065276, Filed Date: Dec. 15, 2011, pp. 9.
"International Search Report", dated Jul. 12, 2012, Application No. PCT/US2011/063207, Filing Date: Dec. 4, 2011, pp. 9.
"International Search Report", dated Jun. 22, 2012, Application No. PCT/US2011/063340, Filed Date: Dec. 5, 2011, pp. 9.
"Notice of Allowance Issued in Chinese Patent Application No. 201110423031.4", Mailed Date: Jan. 23, 2015, 3 Pages.
"Notice of Allowance Issued in Chinese Patent Application No. 201110426179.3", Mailed Date: Nov. 4, 2014, 3 Pages.
"Notice of Allowance Issued in U.S. Appl. No. 12/970,069" Mailed Date: Dec. 8, 2015, 3 Pages.
"Notice of Allowance Issued in U.S. Appl. No. 12/970,069" dated Nov. 12, 2015, 3 Pages.
"Notice of Allowance Issued in U.S. Appl. No. 12/970,069", dated Jan. 29, 2016, 4 Pages.
"Notice of Allowance Issued in U.S. Appl. No. 12/970,069", dated May 15, 2015, 4 Pages.

(56) References Cited

OTHER PUBLICATIONS

"Office Action and Search Report Issued in Chinese Patent Application No. 201110400472.2", dated Oct. 27, 2014, 14 Pages.
"Office Action Received in Australia Patent Application No. 2011343700", dated Jul. 24, 2015, 2 Pages.
"Omnidrive", 2006, retrieved Oct. 26, 2006, 2 pages.
"Xdrive", 2006, retrieved Oct. 26, 2006, 2 pages.
"Second Office Action Issued in Chinese Patent Application No. 201110408217.2", dated May 23, 2014, Filed Date: Dec. 9, 2011, 8 Pages including partial translation.
02 Network Scraps Unlimited Data for Smartphones; Published Date: Jun. 10, 2010; 2 pages.
802.11 Fast BSS Transition (FT) Part 1 of 2; Published Date: Aug. 21, 2007, 5 pages.
A New Location Technique for the Active Office—Published Date: 1997, http://citeseerx.ist.nsu.edu/viewdoc/download?doi=10.1.1.20.5052&rep=repl&type=pdf.
Advisory Action mailed Jan. 2, 2013 in U.S. Appl. No. 11/726,862, 3 pages.
Araujo, Joao Taveira et al., "Towards Cost-Aware Multipath Routing," AIMS 2009, LNCS 5637, 2009, pp. 207-210.
Butler, Kevin R.B. et al.; Leveraging Identity-Based Cryptography for Node ID Assignment in Structured P2P Systems; IEEE Transactions on Parallel and Distributed Systems; vol. 20, No. 12; Dec. 2009; pp. 1803-1815.
Chinese Office Action dispatched Dec. 4, 2013 in CN Patent Application No. 201110426187.8, 8 pages including Concise Explanation of Relevance and/or partial translation.
Chinese Office Action dispatched Feb. 28, 2014 in CN Patent Application No. 201110426179.3, 9 pages including Concise Explanation of Relevance and/or partial translation.
Chinese Office Action dated Jan. 6, 2014 in CN Patent App. No. 201110423068.7, 8 pages including ,concise explanation of relevance and partial translation.
Chinese Office Action dated Jan. 7, 2015 in CN Patent App. No. 201110400433.2, 10 pages including partial translation.
Chinese Office Action dated Nov. 20, 2013 in CN Patent App. No. 201110423001.3, 18 pages including translation.
Chinese Office Action dated Dec. 4, 2013 in CN Patent App. No. 201110408217.2, 12 pages, including Concise Explanation of Relevance and/or partial translation.
Chinese Office Action dated Dec. 4, 2013 in CN Patent App. No. 201110423031.4, 26 pages including translation.
Chinese Office Action dated Feb. 17, 2014 in CN Patent App. No. 201110400433.2, 12 pages including partial translation.
Chinese Office Action dated Feb. 27, 2014 in CN Patent App. No. 201110400472.2, 13 pages including Concise Explanation of Relevance and partial translation.
Chinese Office Action dated Jul. 11, 2014 in CN Patent App. No. 201110423031.4, 13 pages, including partial translation and/or concise explanation of relevance.
Chinese Office Action dated Jul. 13, 2015 in CN Patent App. No. 201110400433.2, 3 pages.
Chinese Office Action dated Aug. 5, 2014 in CN Patent App. No. 201110426179.3, 6 pages, including partial translation.
Chinese Office Action dated Sep. 2, 2014 in CN Patent App. No. 201110408217.2, 6 pages, including partial translation.
Chinese Office Action dated Sep. 4, 2014 in CN Patent App. No. 201110423001.3, 6 pages, including partial translation.
Chinese Office Action dated Sep. 9, 2014 in CN Patent App. No. 201110400433.2, 13 pages including partial translation.
Choi, Jongmyung., "RFID Context-aware Systems", In Proceedings of Sustainable Radio Frequency Identification Solutions, Feb. 1, 2010, pp. 307-331.
Cisco Systems, Inc., "802.11 n Wireless Technology Overview," 2007, 7 pages.
Creating Customized Web Experiences with Windows Media Player 9 Series; Published Date: Nov. 2002; 4 pages.
CRTDH; An Efficient Key Agreement Scheme for Secure Group Communications in Wireless Ad Hoc Networks; Published Date: 2005, 5 pages.
Currie, et al., "Experimental Evaluation of Read Performance for RFID-based Mobile Sensor Data Gathering Applications", In Proceedings of the 7th International Conference on Mobile and Ubiquitous Multimedia, Dec. 3, 2008, pp. 92-95.
Desai, Mitesh, K; "Fast Join of Peer to Peer Group With Power Saving Mode"; U.S. Appl. No. 14/975,818, filed Dec. 20, 2015; 56 pages including Preliminary Amendment filed Dec. 29, 2015.
Extended European Search Report dated May 20, 2014 in EP Patent App. No. 11847426.1 , 8 pages.
Extended European Search Report dated Jun. 8, 2015 in EP Patent App. No. 11849551.4, 6 pages.
Final Office Action dated Jan. 11, 2016 in U.S. Appl. No. 12/970,034, 25 pages.
Final Office Action dated Jan. 16, 2015 in U.S. Appl. No. 12/960,753, 12 pages.
Final Office Action dated Jan. 28, 2015 in U.S. Appl. No. 12/970,034, 24 pages.
Final Office Action dated Jan. 9, 2015 in U.S. Appl. No. 14/318,380, 8 pages.
Final Office Action dated Oct. 25, 2013 in U.S. Appl. No. 12/972,104, 10 pages.
Final Office Action dated Oct. 6, 2014 in U.S. Appl. No. 12/972,104, 10 pages.
Non-Final Office Action dated Oct. 26, 2012 in U.S. Appl. No. 12/967,761, 24 pages.
Non-Final Office Action dated Oct. 27, 2014 in U.S. Appl. No. 13/772,275, 14 pages.
Non-Final Office Action dated Nov. 6, 2013 in U.S. Appl. No. 12/960,730, 16 pages.
Non-Final Office Action dated Nov. 8, 2013 in U.S. Appl. No. 13/844,932, 6 pages.
Non-Final Office Action dated Dec. 7, 2016 in U.S. Appl. No. 14/981,271, 5 pages.
Non-Final Office Action dated Feb. 1, 2016 in U.S. Appl. No. 14/981,271, 8 pages.
Non-Final Office Action dated Feb. 26, 2016 in U.S. Appl. No. 14/600,477, 10 pages.
Non-Final Office Action dated Feb. 28, 2014 in U.S. Appl. No. 12/970,159, 22 pages.
Non-Final Office Action dated Mar. 31, 2015 in U.S. Appl. No. 14/318,380, 7 pages.
Non-Final Office Action dated Apr. 11, 2013 in U.S. Appl. No. 12/972,104, 15 pages.
Non-Final Office Action dated Apr. 14, 2011 in U.S. Appl. No. 11/726,862, 22 pages.
Non-Final Office Action dated Apr. 23, 2015 in U.S. Appl. No. 14/458,203, 10 pages.
Non-Final Office Action dated Apr. 5, 2012 in U.S. Appl. No. 11/726,862, 23 pages.
Non-Final Office Action dated May 23, 2014 in U.S. Appl. No. 12/748,829, 30 pages.
Non-Final Office Action dated May 23, 2014 in U.S. Appl. No. 12/960,730, 18 pages.
Non-Final Office Action dated May 30, 2013 in U.S. Appl. No. 12/970,034, 22 pages.
Non-Final Office Action dated Jun. 10, 2015 in U.S. Appl. No. 12/972,104, 10 pages.
Non-Final Office Action dated Jun. 18, 2014 in U.S. Appl. No. 12/960,753, 12 pages.
Non-Final Office Action dated Jun. 20, 2014 in U.S. Appl. No. 12/972,104, 10 pages.
Non-Final Office Action dated Jun. 23, 2010 in U.S. Appl. No. 11/726,862, 16 pages.
Non-Final Office Action dated Jun. 30, 2015 in U.S. Appl. No. 12/970,034, 26 pages.
Non-Final Office Action dated Jun. 9, 2014 in U.S. Appl. No. 12/970,069, 20 pages.
Non-Final Office Action dated Jul. 18, 2014 in U.S. Appl. No. 12/970,034, 24 pages.

(56) References Cited

OTHER PUBLICATIONS

Non-Final Office Action dated Jul. 29, 2016 in U.S. Appl. No. 14/993,786, 16 pages.
Non-Final Office Action dated Aug. 14, 2015 in U.S. Appl. No. 12/960,753, 16 pages.
Non-Final Office Action dated Aug. 14, 2013 in U.S. Appl. No. 12/967,638, 30 pages.
Non-Final Office Action dated Aug. 16, 2013 in U.S. Appl. No. 12/970,069, 26 pages.
Non-Final Office Action dated Aug. 18, 2016 in U.S. Appl. No. 12/972,104, 13 pages.
Non-Final Office Action dated Aug. 5, 2014 in U.S. Appl. No. 13/844,932, 7 pages.
Non-Final Office Action dated Aug. 9, 2012 in U.S. Appl. No. 12/748,829, 29 pages.
Non-Final Office Action dated Sep. 24, 2012 in U.S. Appl. No. 12/964,492, 10 pages.
Non-Final Office Action dated Sep. 29, 2014 in U.S. Appl. No. 12/748,829, 30 pages.
Non-Final Office Action dated Sep. 4, 2015 in U.S. Appl. No. 14/318,380, 6 pages.
Non-Final Office Action dated Sep. 6, 2012 in U.S. Appl. No. 12/972,230, 10 pages.
Notice of Acceptance dated Oct. 16, 2015 in AU Pat. App. No. 2011343943, 2 pages.
Notice of Allowance dated May 24, 2016 in JP Pat. App. No. 2013-544714, 3 pages.
Notice of Allowance dated Jul. 1, 2016 in RU Pat. App. No. 2013127235, 12 Pages w/o English Translation.
Notice of Allowance dated Sep. 2, 2016 in U.S. Appl. No. 12/960,753, 9 pages.
Notice of Allowance dated Jan. 7, 2016 in U.S. Appl. No. 14/318,380, 8 pages.
Notice of Allowance dated Oct. 19, 2015 in U.S. Appl. No. 13/772,275, 8 pages.
Notice of Allowance dated Oct. 27, 2016 in U.S. Appl. No. 14/600,477, 8 pages.
Notice of Allowance dated Oct. 28, 2015 in U.S. Appl. No. 14/333,386, 12 pages.
Notice of Allowance dated Oct. 8, 2015 in U.S. Appl. No. 12/970,069, 9 pages.
Notice of Allowance dated Nov. 12, 2014 in U.S. Appl. No. 13/844,932, 8 pages.
Notice of Allowance dated Nov. 20, 2012 in U.S. Appl. No. 12/972,230, 9 pages.
Notice of Allowance dated Dec. 26, 2013 in U.S. Appl. No. 12/972,230, 8 pages.
Notice of Allowance dated Feb. 19, 2014 in U.S. Appl. No. 13/844,932, 8 pages.
Notice of Allowance dated Mar. 10, 2014 in U.S. Appl. No. 12/972,230, 8 pages.
Notice of Allowance dated Mar. 20, 2013 in U.S. Appl. No. 12/964,492, 9 pages.
Notice of Allowance dated Mar. 20, 2015 in U.S. Appl. No. 12/970,069, 11 pages.
Notice of Allowance dated Mar. 25, 2013 in U.S. Appl. No. 12/972,230, 8 pages.
Notice of Allowance dated Mar. 4, 2013 in U.S. Appl. No. 12/972,230, 7 pages.
Notice of Allowance dated Mar. 6, 2014 in U.S. Appl. No. 12/967,638, 11 pages.
Notice of Allowance dated Apr. 2, 2014 in U.S. Appl. No. 12/964,492, 9 pages.
Notice of Allowance dated May 23, 2016 in U.S. Appl. No. 14/863,290, 12 pages.
Notice of Allowance dated May 24, 2016 in JP Patent Application No. 2013-544714, 4 pages.
Notice of Allowance dated May 7, 2014 in U.S. Appl. No. 13/844,932, 7 pages.
Notice of Allowance dated Jun. 24, 2015 in U.S. Appl. No. 14/458,203, 11 pages.
Notice of Allowance dated Jun. 27, 2014 in U.S. Appl. No. 12/970,159, 8 pages.
Notice of Allowance dated Jun. 28, 2016 in JP Patent Application No. 2013-544795, 3 pages.
Notice of Allowance dated Jun. 8, 2015 in U.S. Appl. No. 13/772,275, 8 pages.
Notice of Allowance dated Jul. 12, 2013 in U.S. Appl. No. 12/967,761, 12 pages.
Notice of Allowance dated Jul. 24, 2014 in U.S. Appl. No. 12/972,230, 7 pages.
Notice of Allowance dated Aug. 20, 2014 in U.S. Appl. No. 12/964,492, 13 pages.
Notice of Allowance dated Sep. 17, 2014 in U.S. Appl. No. 12/972,230, 7 pages.
Notice of Allowance dated Sep. 3, 2014 in U.S. Appl. No. 12/970,159, 9 pages.
Office Action dated Oct. 26, 2015 in JP Pat. App. No. 2013-543239, 13 pages including translation.
Office Action dated Nov. 16, 2015 in JP Pat. App. No. 2013-544795, 9 Pages.
Office Action dated Nov. 24, 2015 in RU Pat. App. No. 2013127235, 4 Pages w/o English Translation.
Office Action dated Apr. 13, 2015 in CN Pat. App. No. 201110400472.04, 14 pages, including partial translation and/or concise explanation of relevance.
Office Action dated Aug. 13, 2015 in AU Pat. App. No. 2011343943, 5 pages.
Office Action dated Aug. 28, 2015 in JP Pat. App. No. 2013-544714, 5 pages including translation.
Office Action dated Apr. 1, 2014 in CN Pat. App. No. 201110423001.3, 8 pages, including partial translation.
Office Action dated Apr. 3, 2014 in CN Pat. App. No. 201110417153.2, 15 pages, including partial translation and/or concise explanation of relevance.
Office Action dated Aug. 14, 2015 in CN Pat. App. No. 201110417226.8, 6 pages, including partial translation.
Office Action dated Dec. 15, 2014 in CN Pat. App. No. 201110417153.2, 8 pages, including partial translation.
Office Action dated Feb. 3, 2015 in CN Pat. App. No. 201110417226.8, 7 pages, including partial translation and/or concise explanation of relevance.
Office Action dated Jun. 5, 2014 in CN Pat. App. No. 201110417226.8, 14 pages, including partial translation and/or concise explanation of relevance.
Pawar, Pravin et al. "Towards Location based QoS-Aware Network Selection Mechanism for the Nomadic Mobile Services," Dec. 5, 2009, 5 pages.
Roduner, et al., "Operating Appliances with Mobile Phones—Strengths and Limits of a Universal Interaction Device", In Proceedings of the 5th international conference on Pervasive computing, May 13, 2007, 18 pages.
Shared Spectrum, Inc., "Our Technology," Nov. 2010, 2 pages.
Shih, Eugene et al.; Wake on Wireless: An Event Driven Energy Saving; Published Date: Sep. 23-26, 2002; 12 pages.
Sridhar, T.; Wi-Fi, Bluetooth and WiMAX; The Internet Protocol Journal, vol. 11, No. 4; Retrieved Date: Sep. 30, 2010, 9 pages.
Subscription Management; Copyright 2009; Retrieved Date: Jan. 12, 2010; 2 pages.
Symbian Foundation Peer-to-Peer WiFi Inititative (WiFi Direct); Published Date: Sep. 10, 2010, 11 pages.
Texas Instruments, MSP430 Ultra-Low-Power MCUs and TI-RFid Devices, 2 pages, 2009.
T-mobile "Unlimited" Data Usage; Published Date: Mar. 9, 2010; 6 pages.
Torres Service Management Platform; Retrieved Date: Jan. 12, 2010; 2 pages.
VAS Subscription Manager; Retrieved Date: Jan. 12, 2010; 1 page.
Wi-Fi Alliance: FAQs; Published Date: 2010; 19 pages.
Wi-Fi Certified Wi-Fi Direct, Personal, Portable Wi-Fi Technology; Oct. 2010, 14 pages.

(56) References Cited

OTHER PUBLICATIONS

WinLIRC; Published Date: Mar. 17, 2008; 5 pages.
Wireless PC to TV; Retrieved Date: Sep. 9, 2010; 2 pages.
Wood, "Kowari: A Platform for Semantic Web Storage and Analysis", May 27, 2005, 16 pages.
Yuan, Y. et al., "Allocating Dynamic Time-Spectrum Blocks in Cognitive Radio Networks," Sep. 9-14, 2007, 10 pages.
Examiner's Answer dated Dec. 27, 2016 in U.S. Appl. No. 12/970,034, 4 pages.
Non-Final Office Action dated Apr. 14, 2017 in U.S. Appl. No. 15/098,321, 16 pages.
Final Office Action dated Feb. 10, 2017 in U.S. Appl. No. 14/993,786, 14 pages.
Non-Final Office Action dated Feb. 10, 2017 in U.S. Appl. No. 15/233,348, 7 pages.
European Office Action dated Feb. 13, 2017 in EP Patent App. No. 11847426.1, 7 pages.
Final Office Action dated Feb. 2, 2017 in U.S. Appl. No. 12/972,104, 16 pages.
Hassan, Amer, "Secure Protocol for Peer-To-Peer Network"; U.S. Appl. No. 15/409,383, filed Jan. 18, 2017; 61 pages including Preliminary Amendment filed Feb. 2, 2017.
Final Office Action dated Jun. 20, 2016 in U.S. Appl. No. 14/981,271, 9 pages.
Notice of Allowance dated Jun. 19, 2017 in U.S. Appl. No. 15/233,348, 11 pages.
Non-Final Office Action dated Aug. 1, 2017 in U.S. Appl. No. 15/409,383, 11 pages.
"Notice of Allowance Issued in Chinese Patent Application No. 201110400472.2", dated Oct. 22, 2015, 4 Pages.
"Supplementary Search Report Issued in European Patent Application No. 11848261.1", dated May 24, 2017, 8 Pages.
Notice of Allowance dated Jun. 23, 2017 in U.S. Appl. No. 14/993,786, 9 pages.

* cited by examiner

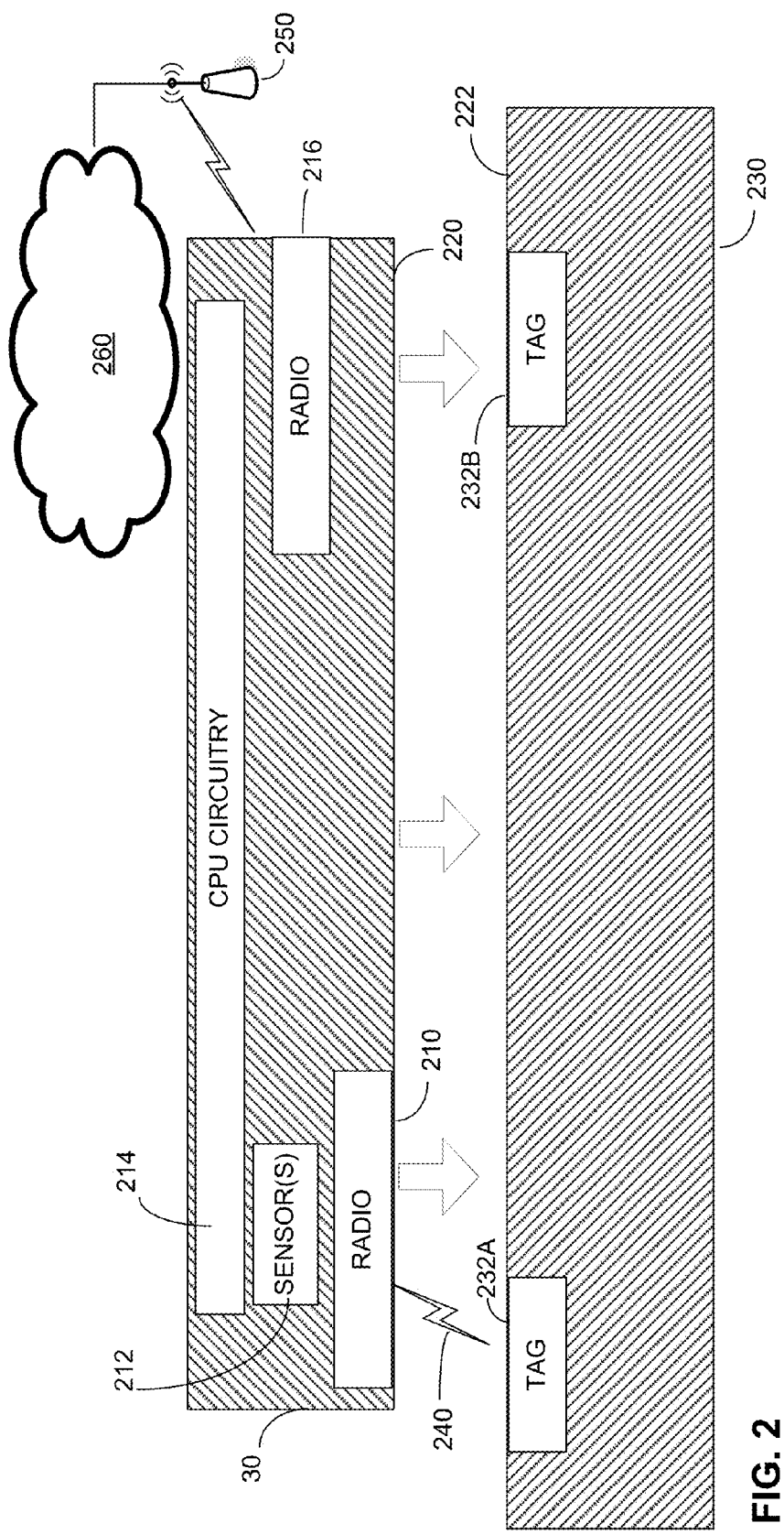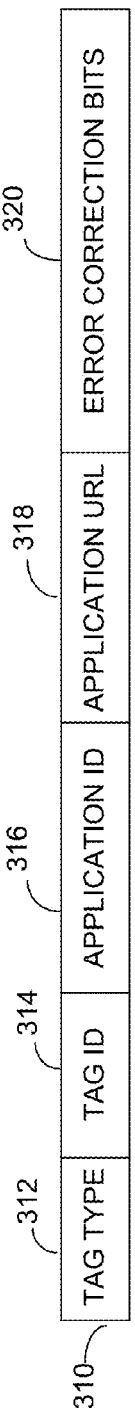

UNIVERSAL DOCK FOR CONTEXT SENSITIVE COMPUTING DEVICE

CROSS-REFERENCE TO RELATED APPLICATION(S)

This application is a continuation of U.S. patent application Ser. No. 12/960,753, filed Dec. 6, 2010, entitled "UNIVERSAL DOCK FOR CONTEXT SENSITIVE COMPUTING DEVICE," now U.S. Pat. No. 9,542,203, issued Jan. 10, 2017. The entirety of this afore-mentioned application is incorporated herein by reference.

BACKGROUND

Computing devices have become nearly ubiquitous and are used by people to perform many business and personal tasks. To support a wide range of functions, computing devices have been made smaller such that users can carry them from place to place. Smart phones, net books, laptop computers and slate computers are all examples of computing devices that have been designed to be carried by users.

Such computing devices may be programmed with applications that, when run, can control the computing device to perform many different operations. For example, a smart phone may run an application that provides route guidance or traffic data. A computer with a slate form factor may display pictures or serve as a game board.

SUMMARY

An experience for a user of a portable computing device may be improved by equipping the computing device to configure itself based on its context. The computing device may use proximity-based communication to determine its location and a desired configuration for that location. Based on an ability to communicate with a tag using proximity-based communication, the computing device may determine that it is in close proximity to the tag. The tag may communicate to the computing device a value that may reveal to the computing device a desired operation for that location.

The computing device may then launch an application or take other action to configure itself. Such actions may include, for example, establishing communication with another device in the location. The specific actions taken, or specific action launched may be based on the value read from the tag.

To facilitate determination of a user intent to express a desired action associated with a location, a support structure may be provided to act as a dock into which a computing device may be placed. The dock may have a surface with one or tags positioned adjacent the surface such that a computing device placed on the surface may read a value from at least one of the tags.

The support structure may be configured to provide a universal dock usable with computing devices of any of a plurality of form factors. To provide a universal dock, an array of tags may be distributed across the surface of the support structure such that a proximity-based radio of a computing device placed on the surface will be close enough to at least one of the tags to read a value, regardless of the specific form factor of the computing device. In addition, the dock may be equipped with a non-contact power supply, for which a computing device may have a corresponding power pick-up component, such that a computing device placed on the dock may receive power without requiring the computing device to have a power connector that mates with a power connector on the dock.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various FIG. is represented by a like numeral. For purposes of clarity, not every component may be labeled in every drawing. In the drawings:

FIG. 2 is a schematic cross-section of a computing device capable of context dependent operation and an associated dock;

FIG. 3 is a schematic illustration of a value read from a tag;

DETAILED DESCRIPTION

Figure 1:
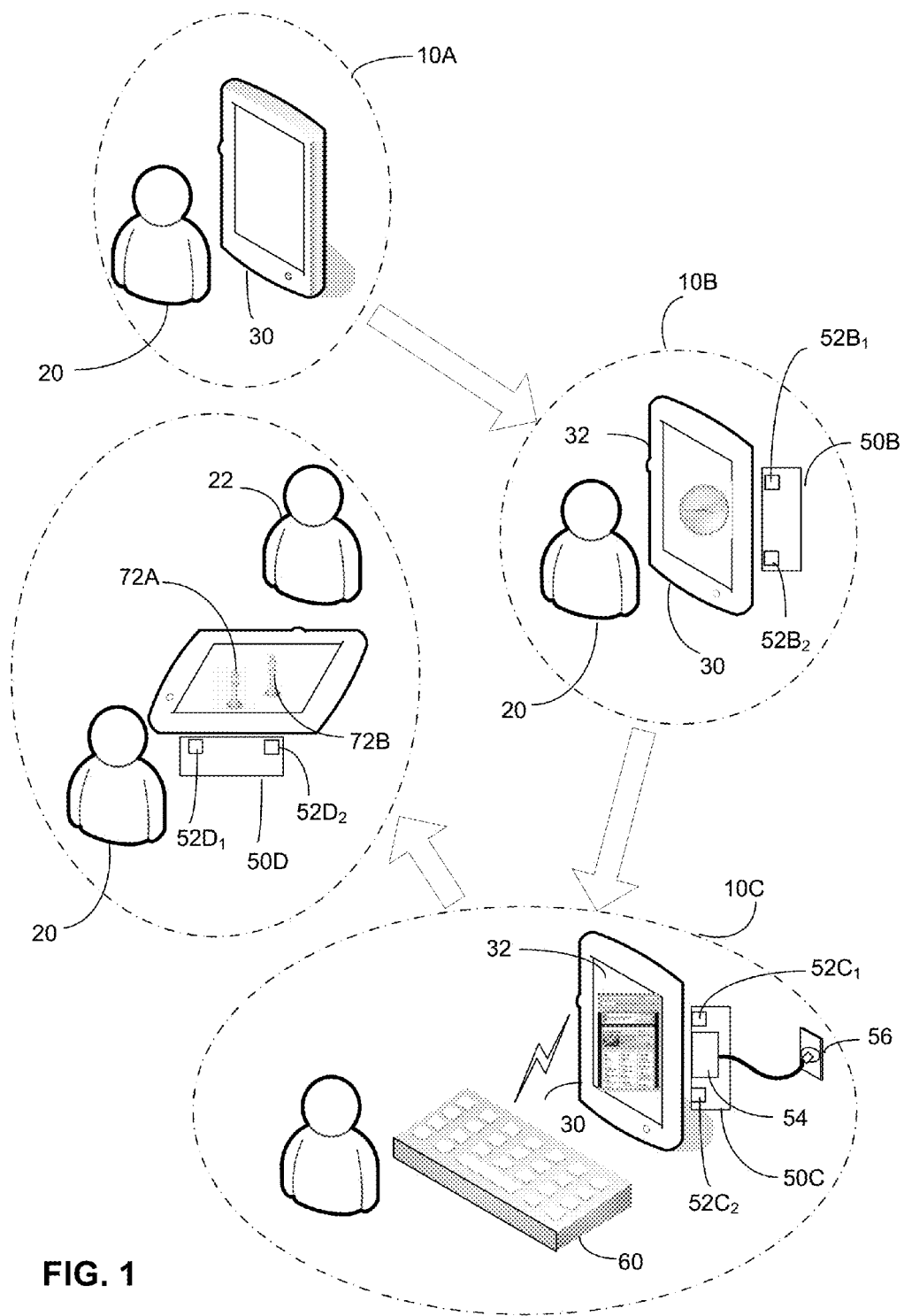
FIG. 1 is a conceptual sketch of a context dependent computer configured to perform different operations in different contexts.

The inventors have recognized and appreciated that an experience for a user of a portable computing device may be significantly enhanced by operating the computing device in a way that is context dependent. The context, and hence a desired operation of the computing device, may be determined based on the location of the computing device and actions from which intent of the user may be inferred. Such operation may be achieved with a computing device that can sense its position relative to locations that have been designated as being associated with a desired configuration of the computing device.

For example, a computing device placed on a nightstand in a bedroom may automatically configure itself as an alarm clock. The same computing device placed near a television may automatically configure itself to stream audio-video content for display on the television. In other instances, a computing device may sense its proximity to a desk in an office and attempt to form a wireless connection with a wireless keyboard and mouse. As yet another example, a computing device may sense that it is positioned on a table in a restaurant and download an application from the restaurant that displays menu options and receives an order from a user.

In some embodiments, the context of a computing device may be determined by reading values from tags using a proximity-based radio. The tags may be passive tags, responding the radiation emitted by the computing device. Though, active tags that respond to low level signals transmitted by the computing device may also be used. Regardless of the specific mechanism by which the tags operate, an ability for a computing device to read a tag signifies that the computing device is positioned close to the tag. The value read from the tag may additionally signify a desired action in that location. Accordingly, tags may be attached to locations in which a computer may be placed by a user as a signal of the user's content.

In some embodiments, the tags may be affixed to a support structure that positions the computing device in a desired orientation for its desired operation. Tags configured to transmit different values may be used with different types of support structures. For example, a support structure for a bedroom where the computing device is intended to operate as a clock may hold the computing device with its display vertically and may contain a tag that signifies that the computing device should configure itself as a clock. In contrast, a support structure in a location where the computing device is intended to operate as a game table may hold the computing device with its display horizontal and may contain a tag that signifies that the computing device should configure itself as a game table.

In addition to providing a place for affixing tags and, in some embodiments, orienting the computing device, a support structure may provide other functions. In some embodiments, a support structure may supply power to a computing device placed on the support structure. Power may be supplied through a non-contact power transfer mechanism, such as inductive or capacitive coupling. With such an approach, any computing device with a suitable non-contact power pick-up mechanism may obtain power when placed on the support structure. By appropriate positioning of tags, possibly in multiple locations over the support structure, any device placed on the support structure may also read a value from one of the tags. In this way, the support structure may act as a form of universal dock for a portable computing device.

A computing device placed on such a dock may configure itself automatically by selecting and launching an application based on a value read from at least one of the tags on the dock. Such a capability may be particularly desirable for a computing device with a slate form factor. Such devices are likely to be carried by uses from place to place, and the experience for those users may be greatly enhanced by configuring the computing device for operations based on context.

Turning to FIG. 1, an example of an environment in which a computing device that configures itself based on context is illustrated. FIG. 1 illustrates a user 20 with a portable computing device 30. In this example, computing device 30 is formatted with a slate form factor. Such a computing device may have a relatively large display 32. Display 32 may be touch-sensitive, providing a user interface with computing device 30. Though embodiments of the invention may be useful with a computing device having a slate form factor, the specific form factor of computing device 30 is not a limitation on the invention.

FIG. 1 illustrates that user 20 may interact with computing device 30 in multiple locations 10A, 10B, 10C and 10D. The nature of the interactions that user 20 desires to have with computing device 30 may be different in each of the locations. As an example, locations 10A, 10B, 10C and 10D may be locations within the home of user 20 where the user desires to have the computer configured for different operations. Location 10A may represent a location at which user 20 generally desires to interact with computing device 30 through its touch screen interface. In contrast, location 10B may represent a bedroom where user 20 would like computing device 30 to operate as an alarm clock. Location 10C, for example, may represent a home office where user 20 would like to use computing device 30 like a conventional desktop computer. Location 10D may represent a family room where user 20 would like for computing device 30 to be configured for playing a game.

Accordingly, each of the locations 10A, 10B, 10C and 10D is associated with a context. In this example, the context is defined both by location and user intent, representing the desired operation of computing device 30 in the location. In accordance with some embodiments of the invention, computing device 30 is adapted to identify its context and automatically configure itself for that context. For example, in location 10A, computing device 30 may present a user interface, such as may appear on a desktop of a conventional computer. In contrast, at location 10B, computing device 30 may execute an application that presents on display 32 a representation of a clock and may present a user interface through which a user may set or cancel an alarm. In location 10C, computing device 30 may form a connection with one or more peripherals through which the user 20 may control computing device 30 like a conventional desktop computer. In this example, location 10C includes a wireless keyboard 60 that may perform a paring ceremony with computing device 30 to form a connection between keyboard 60 and computing device 30. In this way, a user may type on keyboard 60 to provide input to computing device 30. Computing device 30 may also be programmed to form connections with different or additional peripherals. Though not illustrated in FIG. 1, location 10C may include a mouse and a printer, or other devices of the type conventionally used in a home office. In the context illustrated in FIG. 10C, computing device 30 may form connections with any or all of these devices to con itself to perform as a conventional desktop computer.

At location 10D, computing device 30 may configure itself so that it may be used by user 20, and possibly user 22 or other users, in playing a game. As an example, in location 10D, computing device 30 may launch an application that presents on display 32 game pieces 72A and 72B. The application launched in location 10D may perform other operations as part of the game played by user's 20 and 22. For example, such an application may receive input from either user 20 or 22 specifying moves to be made as part of the game, may keep score, may render graphics or other content as entertainment during the game or perform any other suitable operation.

Computing device 30 may use any suitable technique to determine its context such that it can then automatically select how to configure itself to perform operations desired by a user in that context. In the embodiment illustrated in FIG. 1, tags are used to indicate context. Each tag may be a device that can communicate information to computing device 30. This information, for example, may include at least one value that can directly or indirectly indicate a desired configuration of a computing device, such as computing device 30. The tags may be passive or active devices. An example of a passive device may be an RFID tag. As is known in the art, an RFID tag may absorb radiation of a particular frequency and re-radiated encoded with information. That information, in this example, may be a value indicating a desired configuration of the computing device. An example of an active tag may be a small semiconductor chip incorporating a radio and a microcontroller. The microcontroller may operate the transmitter, periodically or in response to an event, to transmit information that may indicate to a computing device a configuration desired.

Regardless of the nature of the tag, the tag may be configured for proximity-based communication. Proximity-based communication may limit the locations in which computing device 30 can access information from a tag. For example, when a radio within a computing device is configured to emit near-field radiation of the type to which an RFID tag will respond, the computing device generally must be within a few inches of the RFID tag to detect a response. In this way, an ability to read a value from the tag identifies the context of computing device 30 by indicating both a desired configuration of the computing device and that the computing device is positioned in a location where that configuration is desired.

In this example, proximity-based communication is achieved by using low power levels for at least a portion of the communication between computing device 30 and the tag. Even if active tags are used, proximity-based communication may be implemented by using relatively low power communication for at least a portion of the interaction between computing device 30 and the tag. Though, it should be appreciated that other techniques may be used to implement proximity-based communication. For example, visible light, infrared or other types of radiation that relies on line of sight may be used to implement a proximity-based radio. Also, a signal conveyed only when devices physically contact each other may serve as another form of proximity-based communication.

In the example of FIG. 1, tags are used to enable computing device 30 to identify different contexts corresponding with different locations 10B, 10C and 10D. Accordingly, FIG. 1 illustrates one or more tags in each of locations 10B, 10C and 10D. In location 10B, tags $52B_1$ and $52B_2$ are shown. In location 10C, tags $52C_1$ and $52C_2$ are shown. In location 10D, tags $52D_1$ and $52D_2$ are shown. The tags in each location may be encoded with values that identify a desired configuration of computing device 30 when in that location. In the example illustrated, each of the locations 10B, 10C and 10D contains multiple tags. In this embodiment, each of the tags at the same location may be encoded with the same value. In this way, even if computing device 30 is not precisely positioned relative to a single tag at that location, computing device 30 may nonetheless receive a value from at least one of the tags. Though, tags in different locations may be encoded with different values to signify to computing device 30 different contexts based on the values read from the tags.

No tag is explicitly shown in location 10A. The absence of a tag in this location may signal to computing device 30 that a default configuration is desired. The default configuration may entail presentation of a "desktop" as in a conventional computing device or may entail some other operating state based on user inputs.

Each of the tags may be positioned in a desired location in any suitable way. The specific approach used for positioning each tag may depend on its physical characteristics. For example, it is known that an RFID tag may be packaged in a wrapper with an adhesive surface that acts like a sticker. Though, it should be appreciated that any suitable mechanism for affixing a tag in a desired location may be used.

In the examples illustrated in FIG. 1, tags, such as tags $52B_1$, $52B_2$, $52C_1$ and $52C_2$, $52D_1$ and $52D_2$, may be imbedded in a structural component that acts as a support for computing device 30. Such a component may form a "dock" for computing device 30 when in a location where computing device 30 is desired to configure itself based on context.

In the example of FIG. 1, docks 50B, 50C and 50D are illustrated in locations 10B, 10C and 10D, respectively. As shown, dock 50B contains multiple tags, of which tags $52B_1$ and $52B_2$ are illustrated. Similarly, dock 50C contains multiple tags, of which tags $52C_1$ and $52C_2$ are visible. Dock 50D also contains multiple tags, of which $52D_1$ and $52D_2$ are visible.

In this example, each of the docks 50B, 50C and 50D is shown schematically to be positioning computing device 30 in an orientation that is appropriate for intended operations in that location. For example, dock 50B is shown holding computing device 30 in an orientation in which user 20 may readily observe the clock on display 32. In location 10C, dock 50C is holding computing device 30 in an orientation, relative to a surface of a desk or table (not shown), in which user 20 may observe information presented on display 32 while using keyboard 60. In location 10D, dock 50D is holding computing device 30 in an orientation in which users 20 and 22 may view game pieces 72A and 72B on display 32 while playing a game.

Though not illustrated by the example of FIG. 1, any of the docks 50B, 50C or 50D may include features to aid in holding computing device 30 in a desired orientation. Such features may include tabs, shelves, clips, hooks or other positioning or holding mechanisms. The positioning or holding mechanisms may be specifically designed to conform to complementary features on computing device 30. Though, it is not necessary that a dock be specifically designed to receive a computing device of any particular size or shape. To the contrary, a dock may be configured to receive a computing device of any contemplated shape such that a universal dock may be provided.

Incorporation of multiple tags may facilitate construction of such a universal dock. Because low level radiation may be used to read a value from a tag, to enable computing device 30 to reliably determine context when placed in a dock, one of the tags should be close enough to an antenna of a radio within computing device 30 that senses and/or transmits radiation used in proximity-based communication. Having multiple tags in a dock, preferably positioned in a pattern across a surface against which computing device 30 will rest, can ensure that an antenna within computing device 30 used for proximity-based communication will be close enough to a tag to ensure reliable communication.

FIG. 1 also illustrates other capabilities that may be incorporated into a dock. As illustrated by dock 50C, a dock may be connected to a power source, such as outlet 56. The power source may be used to supply power to an active tag within the dock. Alternatively or additionally, the power source may be used to supply power for other purposes. As one example, a dock, such as dock 50C, may incorporate a power supply 54 that may be used to supply power to computing device 30 when placed on dock 50C.

Power may be coupled from power supply 54 to a power consuming portion of computing device 30 in any suitable way. In the embodiment illustrated, though, power supply 54 is a non-contact power supply, capable of radiating power for use by computing device 30. Computing device 30 may include a power pick up component to receive and use that power. Use of such a non-contact power supply may further facilitate use of dock 50C as a universal dock. Any computing device configured with a non-contact power pick up may receive power when placed in dock 50C without requiring a connector adapted to mate with a connector on power supply 54.

Turning to FIG. 2, additional details of computing device 30 are illustrated. FIG. 2 shows computing device 30 schematically in cross section. As shown, computing device 30 has a surface 220 that may be placed on a surface 222 of a dock 230. A radio 210, configured for proximity-based communications is positioned adjacent surface 220.

Dock 230 has a support structure, which may be made of metal, plastic or other suitable material. The support structure may contain tags, of which tags 232A and 232B are visible, or may provide attachment locations for such tags. As shown, the tags may be positioned adjacent surface 222. Though FIG. 2 shows only two such tags, tags 232A and 232B may form a portion of an array that extends in two dimensions across surface 222 such that, regardless of where adjacent surface 220 that radio 210 is positioned, radio 210 will be close enough to one of the tags to engage in proximity-based communication.

In this example, tags 232A and 232B are passive tags. Proximity-based communication may be performed using near field radiation 240. In operation, radio 210 may emit near field radiation 240 that may excite tag 232A. Tag 232A may reradiate near field radiation 240 modulated to represent information to be conveyed from tag 232A through radio 210 to processing circuitry within computing device 30.

In this example, tag 232A may be an RFID tag and radio 210 may be a near field radio that emits RF energy for reading an RFID tag as is known in the art. Though, any suitable proximity-based radio and compatible tag may be used.

In some embodiments, such as when computing device 30 emits radiation to excite a passive tag, it may be desirable to limit the period of time during which radiation, such as radiation 240, is emitted. Limiting the amount of time that radiation is emitted may reduce the drain of a battery in computing device 30. Accordingly, computing device 30 may be operated such that radio 210 is only triggered to emit radiation 240 when computing device 30 is likely in the proximity of a tag that may provide context information. Computing device 30 may utilize sensors 212 for this purpose.

Sensors 212 may be sensors specifically added to computing device 30 for the purpose of sensing conditions that would indicate proximity to a tag. Though, in some embodiments, sensors 212 may be sensors of the type conventionally incorporated in a portable computing device. For example, many portable computing devices include accelerometers. Such sensors may be incorporated in a computing device to detect an orientation of the computing device for purposes of configuring a display. Though, such sensors may be used for multiple other purposes, including to facilitate applications that provide route guidance or other motion-based applications.

In the example illustrated, computing device 30 may include CPU circuitry 214 that may execute operating system services and applications. Such circuitry may be programmed to control radio 210 based on the outputs of one or more sensors 212. In operation, CPU circuitry 214 may execute a program that monitors the outputs of sensors 212 to detect when computing device 30 is placed on a surface.

Such a detection may be based on sensing a parameter, including pressure or capacitance, that indicates contact with a surface. Alternatively or additionally, such a detection may be based on a detecting motion or acceleration of the computing device. In response to detecting such positioning of computing device 30, CPU circuitry 214 may enable radio 210 to emit radiation 240. Radio 210 may be controlled to emit radiation 240 to determine whether there is a tag in the proximity of radio 210. If a value can be read from a tag while radio 210 is emitting radiation 240, computing device 30 may determine that it is in a context in which it is intended to configure itself for the context indicated by the value read from the tag. If, after some period of time, which may be a fixed interval or a dynamically selected interval based on noise or other criteria, if no tag is detected, CPU circuitry 214 may turn off radio 210. This process of turning on radio 210 to detect a tag may be repeated each time the output of sensors 212 indicate a possibility of computing device 30 being placed against a surface that may contain a tag.

CPU circuitry 214 may be any suitable circuitry that controls the operation of computing device 30. CPU circuitry 214 may contain one or more hardware components acting as processors. These processors may be programmed to receive and process outputs of sensors 212, and to control radio 210. These processors may also be programmed to perform other actions, such as to receive a value that radio 210 reads from a tag. Any suitable response may be taken in response to reading a value from a tag. Such a response may include determining a desired configuration of computing device 30 based on the value read from the tag and then controlling computing device 30 to automatically assume that configuration.

Any suitable steps may be taken to configured computing device 30. Those steps may include adjusting operational parameters of any suitable hardware or software components within computing device 30. Alternatively or additionally, steps to configure computing device 30 may include establishing connections to one or more other devices. Those devices may be near the tag from which the value was read. Though, communication may be established in any suitable way. For example, FIG. 2 illustrates that computing device 30 may have a second radio 216. While radio 210 is configured for proximity-based communications, radio 216 may be configured for communication at a greater distance. For example, radio 216 may be a radio of the type used to communicate with a wireless LAN or wireless wWAN as are known in the art. Accordingly, a remote device to which a connection is established may be located virtually anywhere. In the example of FIG. 2, CPU circuitry 214 may be programmed to, in response to a value read from a tag, control radio 216 to connect to an external network 260 through an access point 250. External network 260, for example, may be the Internet such that, in response to a value read from a tag, computing device 30 may download information or software to configure computing device 30 from a server accessible over the Internet.

As a specific example, dock 230 may be attached to a table in a restaurant. When placed on dock 230, computing device 30 may read a value from a tag, such as tag 232A. CPU circuitry 214 may be programmed to identify that value as indicating that CPU circuitry 214 should download a program that configures computing device 30 to present a menu for the restaurant. Such a program may also configure computing device 30 to perform other operations desired in that context. For example, computing device 30 may be programmed to receive through a user interface user input reflecting an order for food from that restaurant. That program downloaded into computing device 30 in response to reading a value from a tag may further control computing device 30 to communicate the order information via radio 216 through access point 250 to a computer that can make the order information available to the restaurant. In this way, computing device 30 may perform operations appropriate for the context, which in this example is being placed on a table in a restaurant.

It should be appreciated that the specific configuration assumed by computing device 30 in response to reading a value of a tag may depend on the specific value read. FIG. 3 illustrates various types of information that may form a portion of a tag. One or more of these types of information may form a value read from a tag. In the example illustrated, value 310 includes multiple fields, such as fields 312, 314, 316, 318 and 320. Field 312 may contain information representing a type of tag. If a type field 312 is present in a value, that information may specify a type of operation desired for the computing device in the context. The type information may specify, for example, generally that the computing device 30 should configure itself as a media controller or should seek to pair with other devices near the tag. Such a field may be used for example, when computing device 30 is to configure itself to perform a generic operation. Other fields may be used to more specifically identify operations that are desired in a context.

As an example of a more specific value, field 314 may include an identification value for the tag. Tags may be assigned IDs in accordance with a scheme that ensures that tags have unique identifiers. CPU circuitry 214 may be programmed to associate specific actions with a specific tag identification read in a field 314.

As another example, field 316 may include an identification of an application to be executed in the context. CPU circuitry 214 may be programmed to respond to a tag containing an application ID such as in field 316 by launching an application having that application ID. That application may already be installed on computing device 30. In that scenario, upon identifying such an application, CPU circuitry 214 may access computer executable instructions stored in memory (not shown in FIG. 2) of computing device 30. Using known techniques, CPU circuitry 214 may then launch an application corresponding to those computer executable instructions.

Any suitable mechanism may be used to identify an application having an application ID as specified in the field 316. For example, CPU circuitry 214 may be programmed to search through a manifest, or other store of information, such as a registry, identifying software components installed on computing device 30. Upon detecting a software component with an identification matching the value in field 316, CPU circuitry 214 may launch that software component.

As another example of a mechanism for identifying an application to execute, value 310 may include a field 318 identifying a location where software defining that application may be accessed. In this example, the location from which the application can be obtained in indicated by an address of a location on a network from which computer executable instructions defining that application may be downloaded. In this example, the address on the network may be expressed as a URL for a web server.

In response to receiving a value 310 with a field 318, CPU circuitry 214 may engage a network interface that can communicate over the network from which the software defining the application can be obtained. That network interface may be a wireless network interface and may incorporate a radio different than the proximity-based radio 210 used to read a value from a tag. In the example of FIG. 2, upon reading a value 310 with a field 318 containing an application URL, CPU circuitry 214 may communicate through radio 216 to an access point 250. CPU circuitry 214 may then download software defining the application from network 260. Once downloaded, this application software may be launched by CPU circuitry 214, configuring computing device 30 to perform desired operations for the context in which value 310 was read from a tag.

Other information may be encoded in the value 310. That information may be used for purposes other than to identify an application to launch in the context. In the example of FIG. 3, value 310 includes a field 320. Field 320 includes information that may enhance the reliability of the information read from a tag. In this example, field 320 includes error correcting bits. To reduce errors during communication of the value, the information in value 310 may be encoded with an error correcting code, resulting in additional bits being added to value 310. Field 320 represents those additional error correction bits. Though, it should be appreciated that FIG. 3 is a conceptual illustration of error correction bits associated with value 310. In some embodiments, in which the total number of bits in value 310 may be increased through the use of an error correcting code, those bits may be dispersed throughout the value rather than appearing as a separately identifiable field.

Regardless of how those bits are encoded in value 310, upon receipt of value 310, CPU circuitry 314 may decode the value using the error correcting code, such that any errors introduced in transmission can be corrected. Use of error correcting coding may be beneficial in the application illustrated in which multiple tags may be positioned across surface 222. In that environment, radio 210 may be positioned closer to one of the tags than the others in the array. Nonetheless, radiation 240 emitted by radio 210 may reach other tags in the array, exciting those tags in addition to the closest tag. As a result, radio 210 may detect values from multiple tags. The values from the more distant tags may be weaker than the values from the nearest tag. Nonetheless, those values from the more distant tags will be out of phase with the value from the nearest tag, and have the potential to disrupt communication between radio 210 and the nearest tag. Using an error correcting code may reduce the chances of that disruption.

It should be appreciated that FIG. 3 provides an example of the types of information that may appear in a value read from a tag. In any given embodiment, a value may contain only one type of information or may contain a combination of types of information that is different than expressly illustrated in FIG. 3. The specific types of information in a value read from a tag are not critical to the invention.

Figure 4:
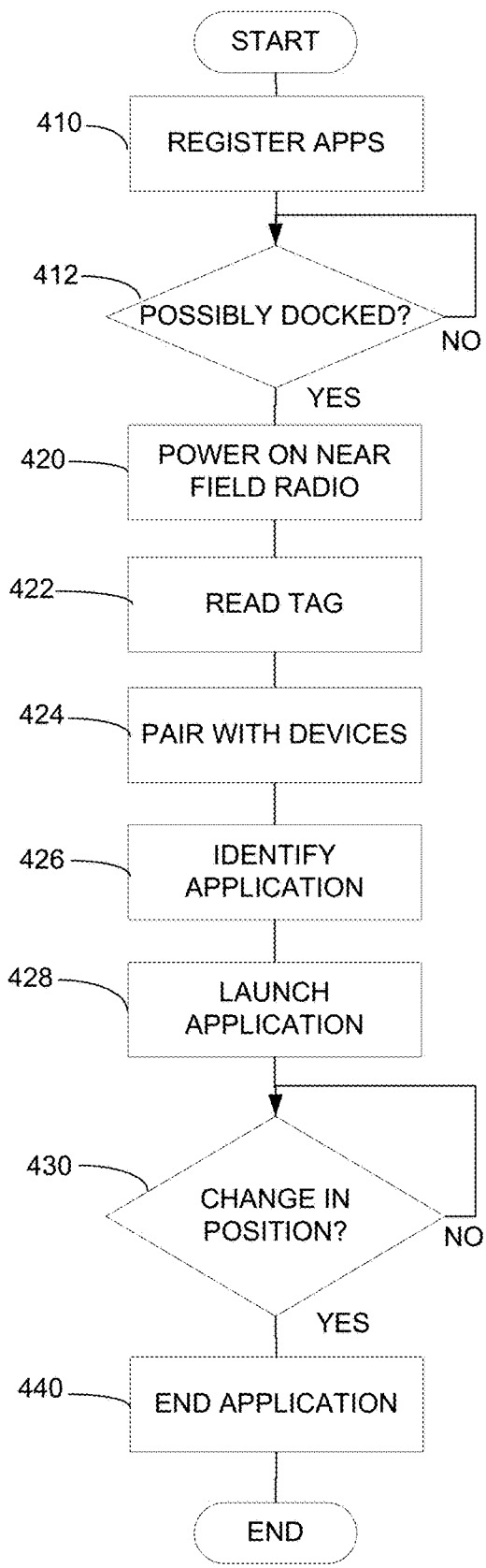
FIG. 4 is a flowchart illustrating a method of operation of a context dependent computing device.

Turning to FIG. 4, an exemplary method for operation of a computing device, such as computing device 30 (FIG. 2) is illustrated. In the example of FIG. 4, the process begins prior to the time that the computing device is placed on a dock. The process may begin with steps that enable the computing device to take a specific response in a detected context. In this example, the process begins at block 410 where applications are registered. Registration may allow the computing device to associate specific desired applications with specific context.

In the embodiment illustrated in FIG. 4, CPU circuitry 214 may have associated with it software defining a platform that automatically configures computing device 30 to perform desired operations based on context. That platform may accept registrations from software components loaded on computing device 30 that are intended to operate in specific context. Such registration may use techniques as are known in the art. For example, registration may include providing the platform with a call back mechanism such that the platform can invoke components of the application to perform desired operations when the context is detected.

In addition, the registration may identify in some way the context in which the application, or components of the application, are to be invoked. As one example, the registration process may entail providing to the platform a tag type or tag ID. When the platform receives a value, such as value 310 with a tag type in a field 312 or a tag ID in a field 314 matching the tag type or tag ID, respectively, provided upon registration, the platform may invoke the application or component associated with that value. Though, any suitable type of information may be provided upon registration that may allow a platform to determine a context in which a particular application or component is to be executed.

This registration may be performed at any suitable time. It may occur, for example, upon start up of computing device 30 or may occur at multiple times as different applications are installed on computing device 30. Though, it should be appreciated that registration at block 410 may not occur at all in some embodiments. For example, in embodiments in which a value 310 contains an application URL or other information that is sufficient for the platform to select an application to execute based on the context defined by the value read from the tag, no explicit registration step may be performed.

Regardless of whether and how registration occurs, the process may proceed to decision block 412. At decision block 412, a check may be made whether the computing device is possibly docked. The determination made a block 412 may be made in any suitable way that determines whether the computing devices in a location that may contain a tag. As described in connection with FIG. 3, this determination may be made based on the output of one or more sensors 212.

Regardless of how the determination is made, if, as a result of processing at decision block 412, it is determined that the computing device 30 is not docked, the process may loop back until a condition is detected in which the computing device may be docked. When that condition is detected, the process may proceed to block 420. At block 420, a component for proximity based communication, such as a near field radio, may be powered on such that any tag in the proximity of the computing device may be read. In this example, radio 210 may use near field RF radiation to energize a tag and may be powered on at block 420. Though, it should be appreciated that any suitable form of energy may be used for proximity-based communication in a proximity-based radio.

Regardless of the specific type of proximity-based radio used, the process may proceed to block 422 where a value may be read from a tag that is in close proximity to the computing device. A value may be read using a process as described above in connection with FIG. 2 or in any other suitable way. Though not expressly illustrated in FIG. 4, if no value can be read, the process may return to decision block 412.

Regardless of how the value is read, the process may proceed to block 424. Block 424 may begin a sub process in which the platform controls the computing device to configure itself to perform operations as desired within the context indicated by the value read at block 422. In this example, the configuration process involves pairing with nearby devices. This pairing may entail wireless communication between the computing device and one or more near by devices according to a predetermined protocol. That wireless communication may be performed by radio 210. Though, in some embodiments, a higher power radio, such as radio 216, may be used for pairing with nearby devices. As a specific example, the pairing may be performed using a BLUETOOTH® radio or a WI-FI DIRECT® radio.

The pairing may be directed towards any suitable device. In some embodiments, pairing at block 424 may entail discovering nearby devices by broadcasting messages according to the predetermined protocol. Alternatively, the value read at block 422 may contain information identifying a specific device or specific type of device for which pairing should be performed. For example, some predefined protocols for pairing devices support service discovery. A value read at block 422 may directly or indirectly identify a type of service to be acquired from a paired device such that processing at block 424 is conditional upon a device providing an indicated service being discovered.

The information read at block 422 may also direct the pairing operation performed at block 424 in other ways. As another example, a value read at block 422 may contain credentials, such as a PIN, that may be used in a pairing ceremony. Providing credential information in connection with a value read from a tag may both ensure that pairing is performed with a desired device for the context of computing device and may reduce the burden on the user of computing device 30. Though, in some embodiments, the predetermined protocol may support re-establishing communication with a device with which computing device 30 has previously paired without user interaction. For example, the WI-FI DIRECT® protocol supports re-establishing a pairing relationship with a device without further user interaction. Accordingly, there are multiple techniques that may be employed such that processing at block 424 does not require user interaction. Though, in some embodiments, user input may be desired to confirm the pairing, supply a PIN or otherwise direct processing at block 424 by providing input through a user interface to computing device 30.

Block 424 represents one type of processing that may be performed to configure a computing device for a specific context. Other processing may alternatively or additionally be performed. As a further example, block 426 illustrates a process step in which the platform identifies an application to execute in the context. Any suitable technique, including those described above in connection with FIG. 3, may be used at block 426 to identify an application based on a value read at block 422. Regardless of the manner in which the application is identified, processing may continue to block 428 where the platform may launch the identified application.

Once launched, the application may continue until it terminates or until the platform receives information that the computing device is no longer in the context for which the application was launched. Accordingly, FIG. 4 illustrates that the process proceeds to decision block 430 where a check is made whether the computing device has changed its position since it was determined at decision block 412 that the computing device has possibly been placed in a position in which it could be resting on a dock containing a tag. Any suitable technique may be used to determine a change in position at decision block 430. For example, an output of one or more sensors 212 indicating that the computing device 30 has moved or been separated from a surface against which it was previously resting may be used as an indication of a change in position at decision block 430. Regardless of the mechanism by which a change in position is detected, if no change is detected, the process may loop, allowing the launched application to continue to execute. In contrast, if the change in position is detected, the process may proceed to block 440. At block 440, the application launched at block 428 may be shut down. By ending the application at block 440, computing device 30 may be returned to its default state in which it is not configured for operation in any specific context. Though, any suitable action may be taken upon detecting that the computing device is no longer in a context for which an application was launched, including requesting input from the user or launching another application.

FIG. 4 illustrates that the process ends following block 440. However, in some embodiments all or portions of the process of FIG. 4 may be repeated while computing device 30 operates. For example, the processing may loop back from block 440 to decision block 412 where a further check may be made for an indication that the computing devices in proximity of additional tags that may indicate a context for which the computing device should be configured.

Figure 5A:
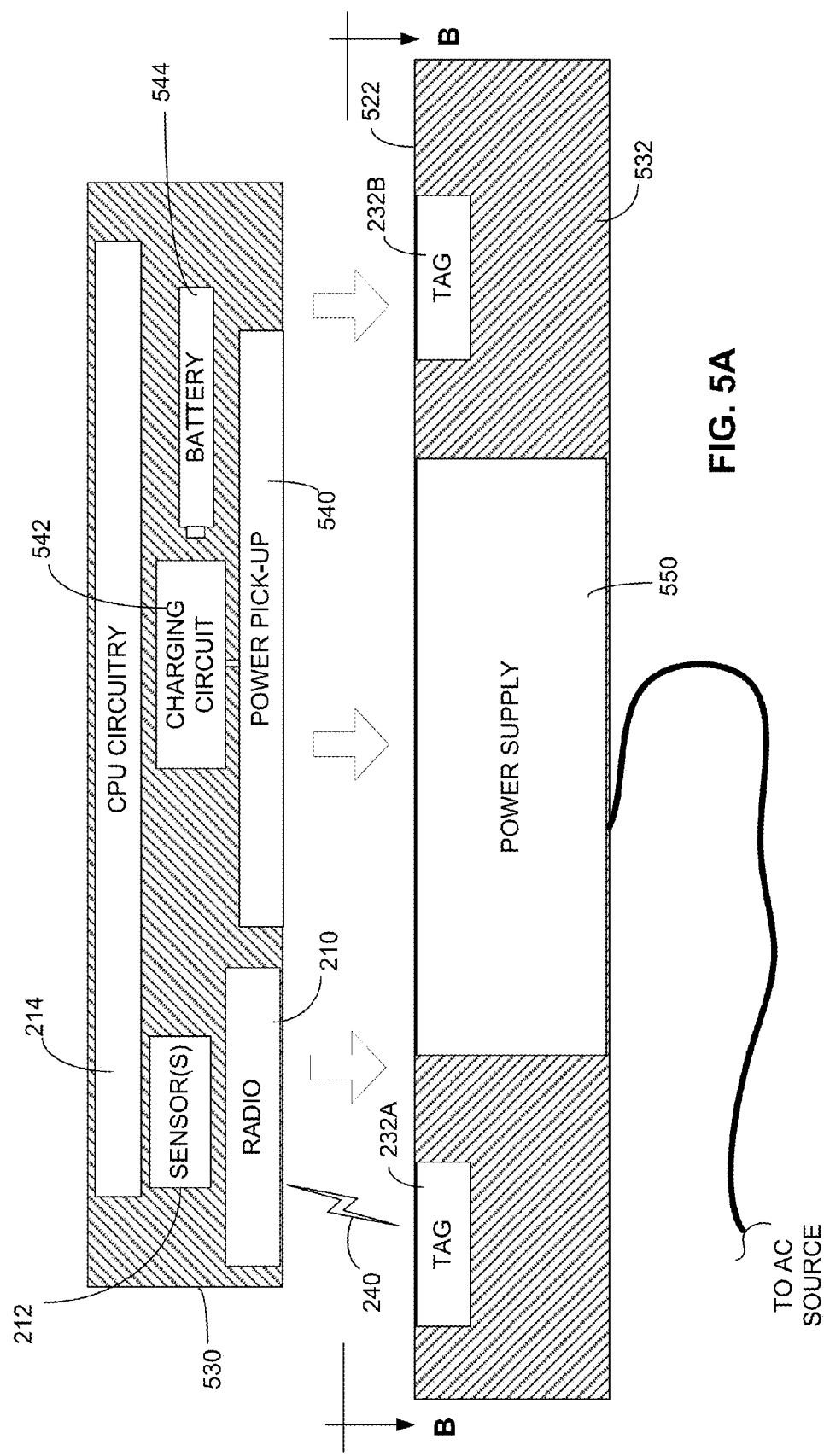
FIG. 5A is a schematic cross-section of an alternative embodiment of a computing device capable of for context dependent operation and an associated dock.

It should be recognized that the system configuration illustrated in FIG. 2 and the process illustrated in FIG. 4 are exemplary only and that other suitable configurations are possible. FIG. 5A illustrates one such suitable alternative configuration. FIG. 5A illustrates a computing device 530 that, like computing device 30 (FIG. 2) may have a slate form factor. Computing device 530 may contain a radio 210, sensors 212 and CPU circuitry 214 that may perform operations similar to those described in connection with FIG. 2. Those operations may include reading a value from an array of tags, which is schematically illustrated by tags 232A and 232B arrayed across a surface of a dock 532.

Dock 532 differs from dock 230 (FIG. 2) in that dock 532 contains a power supply 550. Power supply 550 may be used to transfer power from an AC source, such as outlet 56 (FIG. 1), to computing device 530. In this example, power supply 550 may be a non-contact power supply. For example, power supply 550 may use inductive or capacitive coupling to transfer power to computing device 530 when computing device 530 is placed on surface 522.

To receive the power transferred from power supply 550, computing device 530 may contain a power pick up component 540. Power pickup component 540 is, like radio 210, shown positioned adjacent a surface of computing device 530 that is intended to rest on dock 532. Such a configuration may enhance the rate of power transfer but is not a requirement of the invention. In this example, power supply 550 and power pickup 540 may be implemented using non-contact power transfer technology as is known in the art. Though, any suitable mechanism may be used to transfer power from dock 532 to computing device 530.

In the embodiment illustrated, power pickup 540 is coupled through charging circuit 542 to battery 544. Such a configuration allows battery 544 to be recharged while computing device 530 is placed against dock 532. Though, unlike a conventional computer docking station, no connectors are required on either computing device 530 or dock 532 to enable computing device 530 to charge while in the docking station. Accordingly, a computing device of arbitrary configuration may be placed on dock 532 to recharge battery 544.

Figure 5B:
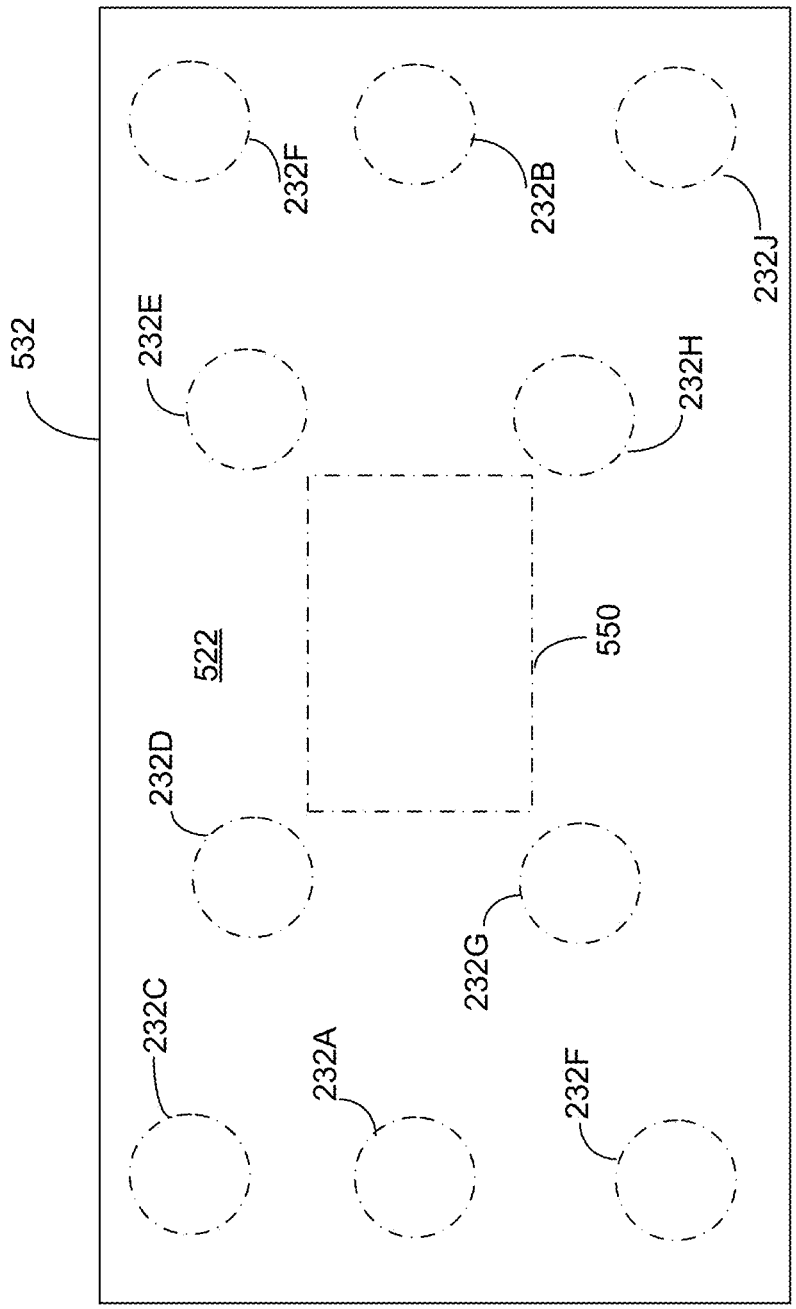
FIG. 5B is a top view of the dock, from the perspective of the line B-B, of FIG. 5A.

To facilitate use of dock 532 by a computing device of an arbitrary configuration, dock 532 may contain a two dimensional array of tags such as tags 232A . . . 232J illustrated in FIG. 5B. FIG. 5B illustrates upper surface 522 of dock 532 from the perspective of the line B-B shown in FIG. 5A. As can be seen in FIG. 5B, the array of tags 232A . . . 232J substantially covers the surface 522 in a pattern that ensures that a proximity-based radio on a computing device placed against surface 522 will be close enough to one of the tags to reliably read a value from that tag. In this example, that two dimensional array is not regular to account for other components. Nonetheless, the tags have a distribution that covers surface 522. FIG. 5B illustrates one possible distribution of tags, but any suitable distribution may be used.

The spacing the tags in the array may be such that the distance between any point on that surface and the nearest tag is less than the distance over which proximity-based communication can be supported. For example, for a system using proximity-based communications designed to support communications over a distance of two inches or less, the tags may be positioned in an array in which tags are separated by a distance of four inches or less. Such a spacing of tags in the array may ensure that any point on the surface is spaced two inches or less from a tag. In this way, regardless of the configuration of computing device 530 and specifically where on the computing device an antenna for proximity-based communication is located, computing device 530 may reliably read a value from a tag when placed on such a dock.

In the embodiment illustrated, each of the tags 232A . . . 232J may have the same construction and may be programmed to supply the same value. With such a configuration, a computing device, such as computing device 530 may respond when placed on dock 532 in the same way, regardless of which of the tags 232A . . . 232J is closest to a radio sensing a value of a tag. Though, other embodiments are possible. For example, tags on the right side of surface 522 may be programmed with a value different than tags on the left side of surface 522. Such a configuration may result in a computing device placed in dock 532 responding differently based on the side of the dock on which the device is placed. As another example, tags, such as tags 232D, 232E, 232G and 232H, on the central portions of the surface 522 may be programmed with different values than tags, such as 232A, 232B, 232C, 232F, 232I and 232J, closer to the perimeter of surface 522. Such an embodiment may be useful when desired operations of computing device 530 differ depending on the size of computing device 530.

In the embodiment illustrated in FIG. 5B, dock 532 contains a single non contact power supply 550 located generally in the center of surface 522. Such a configuration may be useful in implementing a universal dock capable of supplying power to a computing device of arbitrary configuration placed on surface 522 when the overall dimensions of surface 522 are smaller than the distance over which power from power supply 550 can be adequately received by power pick up 540 or other similar components in a computing device that may be placed on surface 522. In other embodiments, multiple power supplies or multiple radiating components associated with a single power supply may be distributed across surface 522. Alternatively, constraints may be placed on a computing device intended to obtain power from dock 532. As an example, in order to obtain power, a device may be required to have a power pick up, such as power pick up 540, near the center of the device. Alternatively or additionally, computing devices may be designed with multiple power pick up components.

Figure 6:
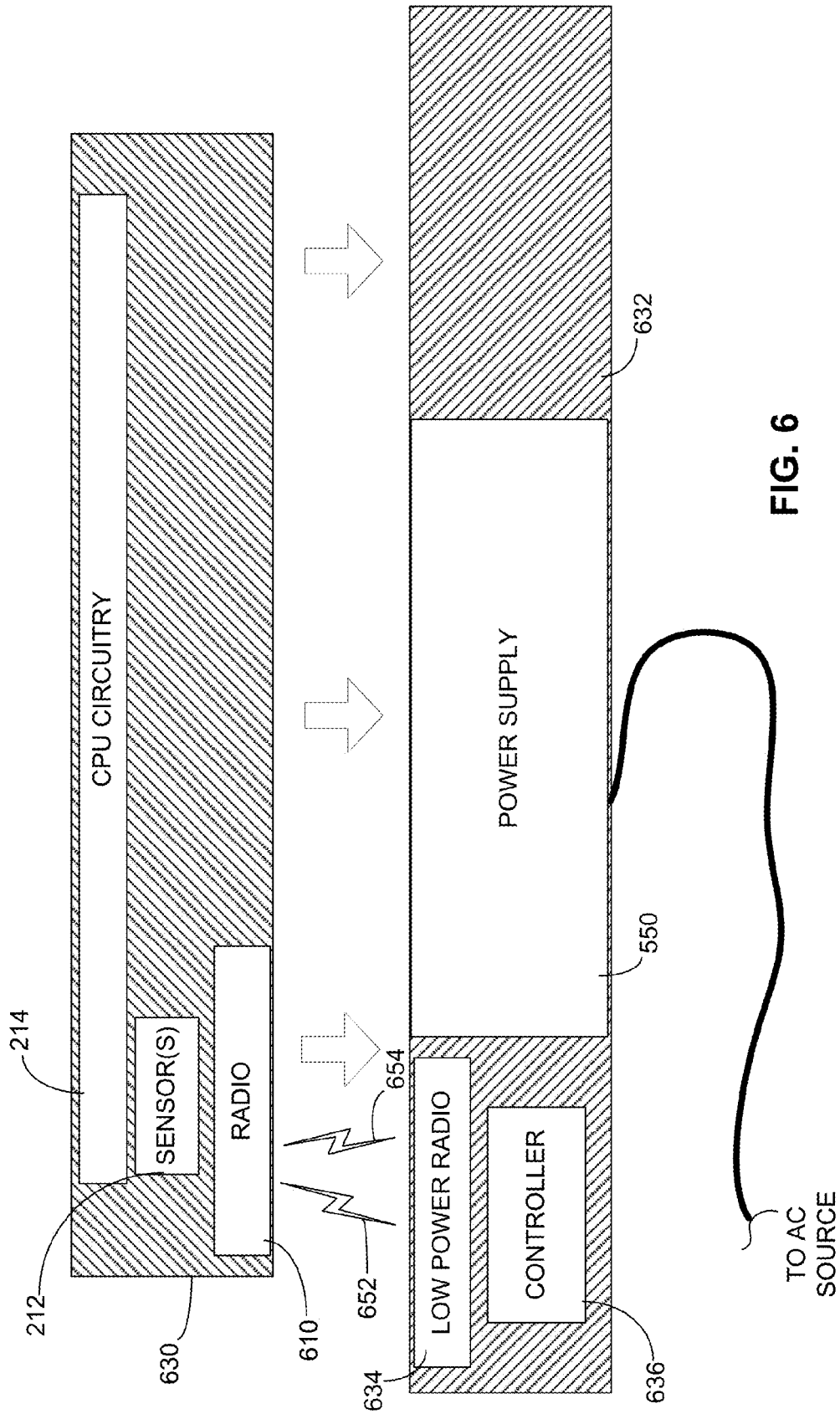
FIG. 6 is a schematic cross-section of a further alternative embodiment of a computing device capable of context dependent operation and an associated dock.

FIG. 6 illustrates a further alternative embodiment. As with dock 532, dock 632 is actively powered. Dock 632 includes a power cord for connection to an AC source of power. In addition to supplying power for a non-contact power supply 550, power input to dock 632 may power active components within the dock. In this example, dock 632 may contain a low power radio 634, which may act as a tag.

A controller 636 may be included in dock 632 to process information received by low power radio 634 and to control the timing and content of information transmitted by low power radio 634. In this example, low power radio 634 may transmit at a relatively low power level, such as −3 dBm or on the order of between 0.1 milliwatts and 1 milliwatts. At such low power levels, a standard radio for a computing device may only reliably receive information transmitted by low power radio 634 when in close proximity to the low power radio. In this way, low power radio 634 may allow radio 610 to act as a proximity-based radio in relation to information received from a low power radio 634.

Any suitable protocol may be used to allow dock 632 and computing device 630 to exchange information such that computing device 630 receives a value through low power radio 634 that indicates a context.

In this embodiment in which dock 632 is connected to a fixed source of power, low power radio 634 may transmit a signal that will initiate an interaction between computing device 630 and dock 632 that will result in computing device 630 receiving a tag value. In this scenario, though computing device 630 may incorporate sensors 212, outputs of those sensors need not be used to determine when to control radio 610 to transmit. Rather, radio 610 may be operated in a low power receive mode in which it can receive a signal transmitted by low power radio 634. Such a low power mode may be implemented simply by operating low power radio 610 with its transmitter powered off. Though, operating states in which the sensitivity of radio 610 is reduced in order to further save power may also be used.

Alternatively or additionally, low power operation of radio 610 may be achieved by reducing the time in which radio 610 is powered at all. For example, radio 610 may be normally powered off, but powered on for occasional brief intervals to detect whether computing device 630 is in the vicinity of a tag, which can be determined by attempting to receive a value transmitted by low power radio 634. Any suitable protocol may be used for radio 610 to scan for such a signal from a low power radio. For example, low power radio 634 may send a control packet, formatted as a beacon for example, at periodic intervals. Radio 610 may scan for such beacons on a periodic schedule, but for intervals long enough to detect a beacon quickly.

Once radio 610 detects the packet from low power radio 634, any suitable signals may be exchanged between computing device 630 and dock 632 to facilitate an exchange information. As one example, low power radio 634 may be controlled by controller 636 to transmit a value identifying devices in the vicinity of dock 632.

As one example of how such a signal may be used to communicate a tag value to computing device 630, controller 636 may control low power radio 634 to periodically transmit a beacon signal 654. When computing device 630 is close enough to dock 632 that hardware within radio 610 can detect such a signal, radio 610 may generate a control signal within computing device 630 to trigger CPU circuitry 214 to perform an operation, such as pairing with devices in the vicinity of dock 632. Transmission of a value may be formatted in any suitable way, for example as an information element in a control signal of a WI-FI protocol. For example, low power radio 634 may transmit a tag value as an information element in a beacon signal transmitted according to a WI-FI protocol. In this way, when radio 610 is in close proximity to low power radio 634 and CPU circuitry 214 is awake, the radio may detect the beacon 652, and that beacon may be processed by execution of controlling software within CPU circuitry 214. That processing may result in configuring computing device 630 for the context indicated by the value contained within the beacon. Configuring the computing device may include pairing with other devices, launching applications, or performing any other suitable steps.

Figure 7:
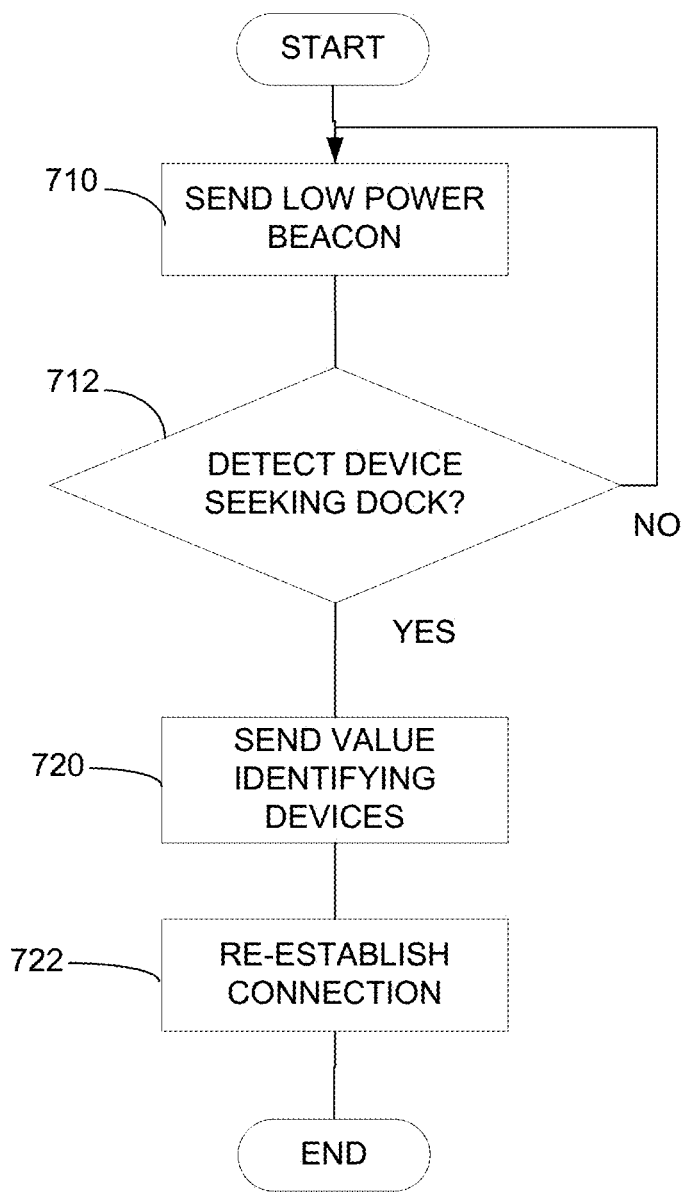
FIG. 7 is a flowchart of a process of operating a context dependent computing device and an associated dock according to some embodiments of the invention.

Though, any suitable protocol may be used for a computing device placed near dock 632 to establish communication with dock 632 such that the computing device 630 may receive a tag value. FIG. 7 illustrates a process of operation of computing device 630 and dock 632 by which such a connection may be established to enable computing device 630 may determine context depended actions. The process may begin at any suitable time, such as when device 630 is powered on. Alternatively, the process may begin when sensors to 12 output an indication that computing device 630 has been placed against a surface or otherwise positioned such that it may be in proximity with a dock. Suppressing sending beacons, even low power beacons, until computing device 630 is detected to be in a position when it is likely placed in a dock may further save power on the computing device.

In the example illustrated in FIG. 7, computing device 630 may operate in a low power mode when computing device 630 is not actively performing operations for a user. In that low power mode, CPU circuitry 214 may be powered off. Radio 610 may operate in a low power mode in which it periodically emits a low power beacon and responds only to specific types of messages received.

Accordingly, the process of FIG. 7 begins at block 710 in this low power mode with radio 610 periodically sending a low power beacon. The low power beacon may be in a format that low power radio 634 may receive and controller 636 may process to identify that there is a device near dock 632 seeking a dock. The beacon may be formatted in accordance with the service discovery protocol as is known in the art or in any other suitable format. The beacon may identify generically the computing device 630 is seeking a dock, or the beacon may identify a specific type of dock, such as a dock associated with computer peripherals as illustrated in location 10C (FIG. 1).

Regardless of the format the beacon transmitted at block 710, the process may continue to decision block 712. At decision block 712, the process may branch depending on whether dock 632 detects a beacon representing a device seeking a dock. Dock 632 may detect the beacon from device 630 when device 630 is brought close enough to dock 632 such that the low power beacon may be received. As illustrated in FIG. 7, the process may loop back to block 710 if the dock 632 does not detect the beacon. As illustrated, device 630 may then send another low power beacon such that low power beacons are periodically sent. The period at which low power beacons are sent may be relatively long so as to conserve power on device 630.

When controller 636 detects a beacon, the process may continue to block 720. At block 720, controller 636 may command radio 634 to transmit a response, which may be in any suitable format, such as a control packet. That packet may be formatted with a value that may be used on computing device 630 to perform an operation, such as pairing with nearby devices.

CPU circuitry 214 may be programmed to respond to such a tag value by configuring itself to perform operations appropriate for the context associated with dock 632. Those operations may include any of the operations described above or any other suitable operation. Though, as a specific example, processing may proceed to block 722 where CPU circuitry may control radio 610 to pair with devices identified by the tag value. As a specific example, the tag value may identify human interface devices in the vicinity of dock 630. In this way, bringing the computing device into the vicinity of the dock may trigger the computing device to pair with human interface devices, automatically creating functionality that emulates functionality when a computer is physically coupled to a conventional dock with human interface devices wired to the dock.

Figure 8:
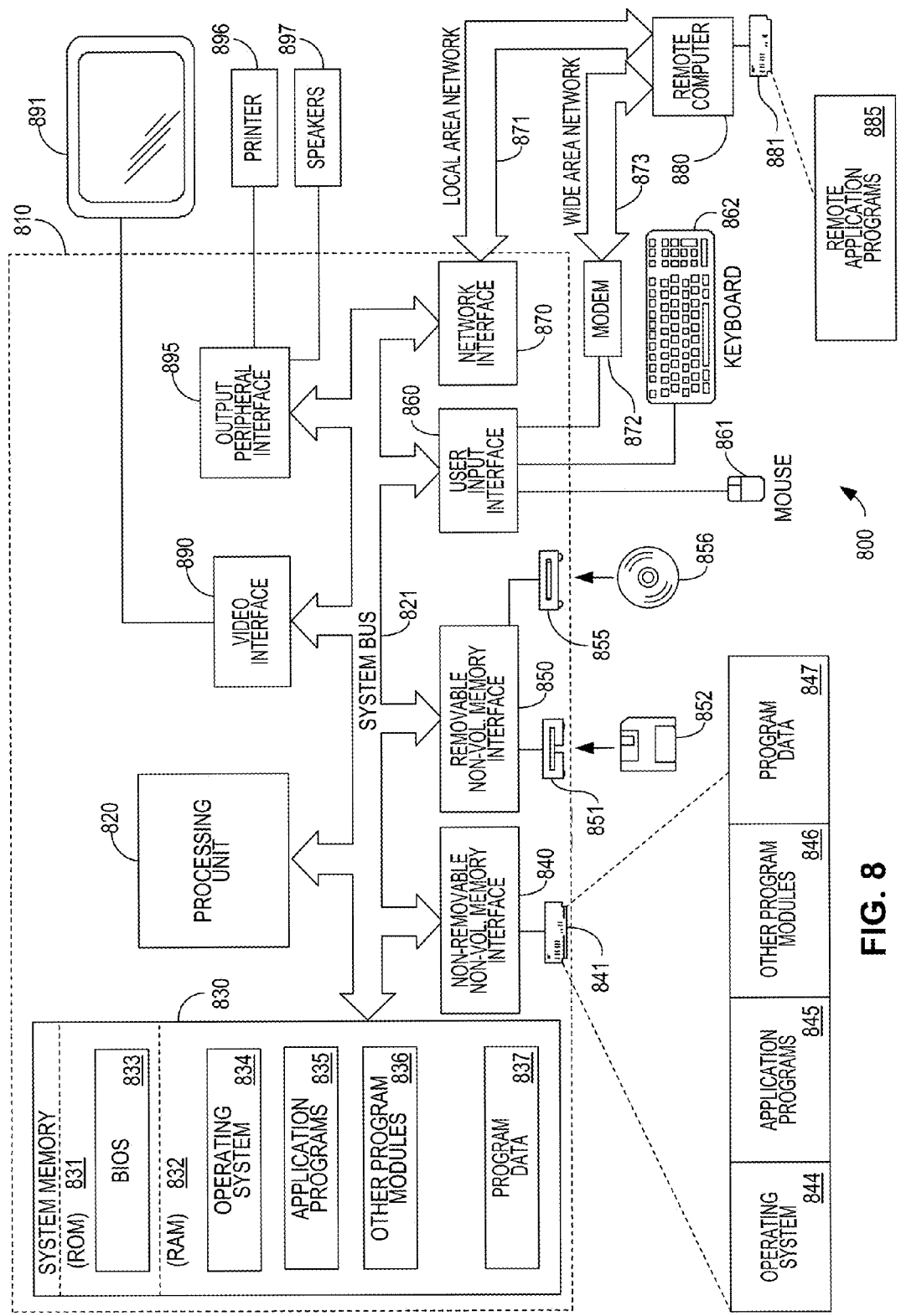
FIG. 8 is a functional block diagram of components that may exist in a computing device, instead of or in addition to those illustrated in the foregoing figures.

FIG. 8 illustrates an example of a suitable computing system environment 800 on which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, specific contexts and associated configurations have been described. These contexts and configurations should be understood to be exemplary and not limiting. There are many other possible contexts and configurations in which the techniques described above may be employed. For example, a tag may be affixed to a dashboard of a car such that when a computing device is placed on the dashboard, it operates as a GPS navigation system.

As another example, a dock may be constructed from a support structure specifically, configured to act as a dock. However, the support structure may serve other purposes. For example, the support structure may be a housing for a television set or may be a surface of a table in a restaurant modified to include components of a dock.

As another example, it is described that low power radio is placed near a surface of a computing device. In some embodiments, only an antenna for the radio may be positioned near the surface. Other components of the radio may be set back from the surface.

Moreover, it should be appreciated that examples of a support structure holding a tag have been provided for illustration only. Any suitable support structure may be used to hold a tag. Moreover, it is not necessary that the computing device be placed on a support structure for the system to operate as described above, The support structure may be an existing structure, such as a wall or a surface of an appliance. In these scenarios, simply bringing the computing device into the vicinity of the tag may be trigger a desired operation, such as launching an application.

Further, it was described that detecting a tag may cause a computing device to perform a context dependent operation. It should be appreciated that, in some embodiments, a dock may be regarded as a computing device and a computing device may have a surface supporting a tag. When the computing device is brought near the dock, the dock may respond in any of the ways described above.

Accordingly, it should be appreciated that either or both of the computing device and the dock may configure themselves based on a relative distance between them. As an example, upon detecting a computing device in close proximity, a dock may power on peripherals with which the computing device may attempt to pair.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A dock for a computing device, the dock comprising:
a support structure configured to receive the computing device in response to the computing device being placed on a support surface of the dock; and
a plurality of tags configured to wirelessly transmit multiple values to the computing device, wherein the multiple values include tag identifiers that identify individual tags of the plurality of tags and an application identifier that indicates that an application having a corresponding application identity is to be executed by the computing device to automatically configure the computing device for use with the dock in response to a reading of the application identifier by the computing device, and wherein the application is associated with a location of the dock.

2. The dock of claim 1, wherein:
the dock comprises a two-dimensional array of tags disposed across the support surface; and
the plurality of tags comprise at least a portion of the two-dimensional array.

3. The dock of claim 2, wherein:
the application identifier indicates to the computing device that the computing device is to perform a pairing ceremony with at least one wireless computer peripheral.

4. The dock of claim 2, wherein multiple of the plurality of tags are active tags.

5. The dock of claim 2, wherein:
each of the plurality of tags in the two-dimensional array is encoded with the same value.

6. The dock of claim 2, wherein:
each of the plurality of tags in the two-dimensional array is encoded with different values according to an error control code.

7. The dock of claim 5, wherein the plurality of tags comprise passive tags.

8. The dock of claim 1, wherein at least one of the plurality of tags comprises an active tag, the active tag comprising:
a radio;
a controller, coupled to the radio, the controller configured for:

detecting, in a signal received by the radio, an indication of a computing device in a vicinity of the dock; and in response to detecting the indication, controlling the radio to transmit at least one of the multiple values.

9. A method of operating a dock for a computing device, the method comprising:

supporting the computing device on a support surface of the dock;

receiving radiation from the computing device; and in response to receiving the radiation, emitting radiation from a plurality of tags, wherein the radiation from the plurality of tags encode multiple values, the multiple values including values identifying individual tags of the plurality of tags, and a value indicating that an application with a corresponding identity is to be executed by the computing device to automatically configure the computing device for use with the dock in response to the computing device receiving the value, wherein the application is associated with a location of the dock.

10. The method of claim 9, wherein:
the emitted radiation has a power between 0.2 milliwatts and 1 milliwatt.

11. The method of claim 10, wherein:
receiving radiation from the computing device comprises receiving a beacon; and
the emitted radiation also encodes another value indicative of at least one device in the vicinity of the dock for pairing with the computing device.

12. The method of claim 11, wherein:
the at least one device includes a plurality of human interface devices.

13. The method of claim 11, wherein:
the received radiation comprises a control packet comprising an information element;
the method further comprises analyzing the information element; and
the emitting radiation comprises emitting radiation in response to the analyzing determining that the information element identifies a service available from a device in the vicinity of the dock.

14. The method of claim 9, wherein the plurality of tags are arranged in a two-dimensional array that substantially covers the support surface of the dock.

15. A dock for a portable computing device, the dock comprising:

a support structure having a surface configured to receive the computing device; and a plurality of tags, encoded with multiple values, the multiple values including tag identifiers that identify individual tags of the plurality of tags and the multiple values including an application identifier indicating that an application having a corresponding identifier is to be executed by the computing device to automatically configure the computing device for use with the dock in response to a reading of the application identifier by the computing device, the plurality of tags configured to wirelessly transmit the value to the computing device, wherein the application is associated with a location of the dock.

16. The dock of claim 15, wherein the plurality of tags includes at least one of passive or active tags.

17. The dock of claim 15, wherein:
multiple of the plurality of tags in a two-dimensional array and are encoded with different values.

18. The dock of claim 15, wherein:
the support structure comprises a member for holding the computing device against the surface with a screen of the computing device positioned with a predetermined orientation; and
the application identifier identifies a software application that, when executed, formats information for presentation on the screen in the predetermined orientation.

19. The dock of claim 15, wherein:
the support structure is configured for receiving a slate form factor computing device.

20. The dock of claim 19, wherein:
the dock is in combination with at least one wireless computer peripheral; and
the application identifier indicates to the computing device to perform a pairing ceremony with the at least one wireless computer peripheral.

* * * * *